(12) United States Patent
Wei

(10) Patent No.: US 11,748,341 B2
(45) Date of Patent: Sep. 5, 2023

(54) METHOD, APPARATUS, AND SYSTEM FOR FORM AUTO-REGISTRATION USING VIRTUAL TABLE GENERATION AND ASSOCIATION

(71) Applicant: KONICA MINOLTA BUSINESS SOLUTIONS U.S.A., INC., San Mateo, CA (US)

(72) Inventor: Junchao Wei, San Mateo, CA (US)

(73) Assignee: KONICA MINOLTA BUSINESS SOLUTIONS U.S.A., INC., Foster City, CA (US)

( * ) Notice: Subject to any disclaimer, the term of this patent is extended or adjusted under 35 U.S.C. 154(b) by 115 days.

(21) Appl. No.: 17/218,026

(22) Filed: Mar. 30, 2021

(65) Prior Publication Data

US 2022/0318240 A1    Oct. 6, 2022

(51) Int. Cl.
| | |
|---|---|
| *G06F 16/242* | (2019.01) |
| *G06F 16/2453* | (2019.01) |
| *G06N 3/08* | (2023.01) |
| *G06F 16/2452* | (2019.01) |
| *G06F 16/22* | (2019.01) |
| *G06F 16/2458* | (2019.01) |

(52) U.S. Cl.
CPC ...... *G06F 16/2428* (2019.01); *G06F 16/2282* (2019.01); *G06F 16/2462* (2019.01); *G06F 16/24522* (2019.01); *G06F 16/24534* (2019.01); *G06N 3/08* (2013.01)

(58) Field of Classification Search
CPC ............. G06F 16/2428; G06F 16/2282; G06F 16/24522; G06F 16/24534; G06F 16/2462; G06N 3/08; G06N 3/0464; G06N 3/09
See application file for complete search history.

(56) References Cited

U.S. PATENT DOCUMENTS

| | | | | |
|---|---|---|---|---|
| 2004/0205530 | A1* | 10/2004 | Borg | G06F 40/174 715/234 |
| 2005/0198563 | A1* | 9/2005 | Kristjansson | G06F 40/174 715/224 |
| 2014/0304097 | A1* | 10/2014 | Milian | G06Q 30/0641 705/26.1 |
| 2018/0285982 | A1* | 10/2018 | Pai | G06Q 40/12 |
| 2021/0103975 | A1* | 4/2021 | Walters | G06Q 30/0641 |
| 2021/0192129 | A1* | 6/2021 | Garg | G06F 40/174 |

OTHER PUBLICATIONS

Wu, Personal Information Classification Based on Deep Learning in Automatic Form Filling System, pp. 437-445 (Year: 2020).*
Toda, A Probabilistic Approach for Automatically Filling FormBased Web Interfaces, pp. 151-160 (Year: 2010).*

* cited by examiner

*Primary Examiner* — Albert M Phillips, III
(74) *Attorney, Agent, or Firm* — SQUIRE PATTON BOGGS (US) LLP

(57) ABSTRACT

In different kinds of forms with incomplete lines, or with different color cells in lieu of lines, virtually completing or providing the lines enables formation of tables from which keywords and content in the forms may be identified. Where a form may have one or more such tables, as can be the case with forms with irregular formats, multiple tables may be identified, to facilitate identification of keywords and content in each such table. In embodiments, deep learning techniques may be applied. Cost analysis involving minimum distances between keywords and content may be performed, with the cost analysis also facilitating formation of a keyword dictionary and a content dictionary.

18 Claims, 19 Drawing Sheets

| Widget Order | | | | | | | | | | | | | |
|---|---|---|---|---|---|---|---|---|---|---|---|---|---|
| Widget | Quantity | Price | | | | | | | | | Total | | |
| | | | | | | | | | | | | | |
| | | | | | | | | | | | | | |
| | | | | | | | | | | | | | |
| | | | | | | | | | | | | | |
| Subtotal | | | | | | | | | | | | | |
| Sales Tax | | | | | | | | | | | | | |
| Total | | | | | | | | | | | | | |

FIG. 1A

| Widget Order | | | |
|---|---|---|---|
| | Widget | Quantity | Price | Total |
| | XY-1447 | 4 | 250 | 1000 |
| | | | | |
| | | | | |
| | | | | |
| | | | | |
| | | | | |
| | | | | |
| Subtotal | | | | 1000 |
| Sales Tax | | | | 95 |
| Total | | | | 1095 |

FIG. 1B

| Widget Order | | | | | | | | | | |
|---|---|---|---|---|---|---|---|---|---|---|
| | Widget | Quantity | Price | | | | | | | Total |
| XY-1447 | ◆ | ◆ 4 | ◆ 250 | | | | | | | ◆ 1000 |
| | | | | | | | | | | |
| | | | | | | | | | | |
| | | | | | | | | | | |
| | | | | | | | | | | |
| | | | | | | | | | | |
| | | | | | | | | | | |
| Subtotal | | | | | | | | | ↑ | 1000 |
| Sales Tax | | | | | | | | | ↑ | 95 |
| Total | | | | | | | | | ↑ | 1095 |

FIG. 1C

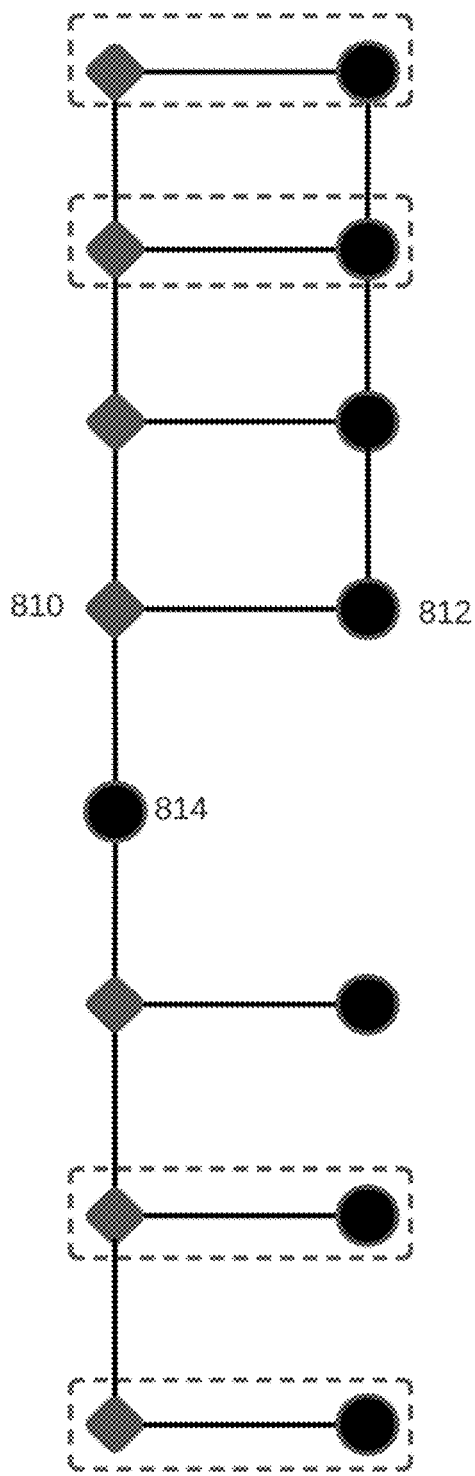
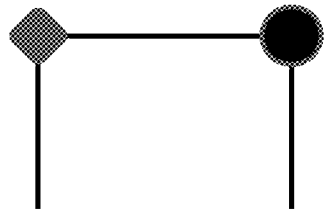
FIG. 8B
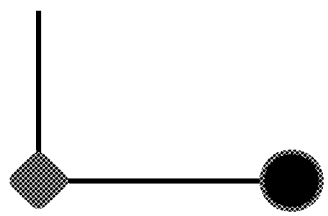
FIG. 8C
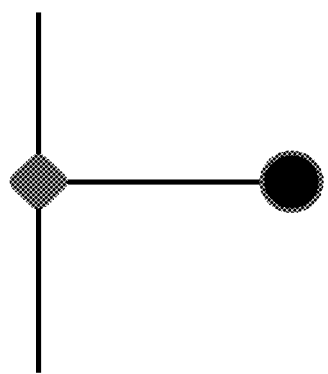
FIG. 8D
FIG. 8A

FIG. 9

METHOD, APPARATUS, AND SYSTEM FOR FORM AUTO-REGISTRATION USING VIRTUAL TABLE GENERATION AND ASSOCIATION

CROSS-REFERENCE TO RELATED APPLICATIONS

The present application is related to U.S. application Ser. No. 17/218,028, filed Mar. 30, 2021, entitled "Method, Apparatus, and System for Auto—Registration of Nested Tables from Unstructured Cell Association for Table—Based Documentation". The present application incorporates all of this related application by reference in its entirety.

BACKGROUND OF THE INVENTION

Automatic registration of forms can be challenging, particularly when identifying and associating keywords and content. Here, keywords may be text that may be associated with a particular field of a form, in which certain types of data (content) may be expected in order to fill that particular form field. A keyword may be considered to be a header of or for a field, and the content may be considered to be data that goes into that field. Content may occupy one or more fields if it comprises more than one line in a filled-in form.

When an empty (blank) form or template is available, keywords (field headers) may be identified fairly readily. The visibility of the keywords facilitates association of the keywords with each other, for example, in a spatial (left/right, up/down) relationship, which also may be termed a geometrical relationship.

There are rules to enable association of keywords going from left to right or from up to down without using table information. Those rules are relatively easily implemented for fixed forms, for example, forms with regular rows and columns in some kind of tabular format. However, as forms become more and more complicated, such association becomes more difficult. For example, with a so-called floating form, keywords may not appear in uniform or regular locations. For example, the keywords may not appear in a single table, or may not appear in consistent locations in the form. In one aspect, the keywords may appear in multiple tabular formats throughout the form. In another aspect, these multiple tabular formats may not all be the same, or may be different from each other. Thus, there may be different tabular formats within a single form. Because of irregular location of keywords, there can be exceptions to otherwise might be fixed rules of association of keywords and content. As a result, there can be a failure to associate keywords with content accurately.

Modifying existing fixed rules to account for floating forms can cause problems when applying those modified rules to earlier examples (e.g. fixed forms). It is not easy to modify those rules without potentially breaking early tested working cases. It would be desirable to provide a more robust and unified algorithm to address these and other issues. It also would be desirable to be able to extend the algorithm subsequently for what might be considered completely free form registration of keywords and content, that is, where keywords might appear anywhere on a form, and content may appear either to the right of or below a keyword.

SUMMARY OF THE INVENTION

To address the foregoing and other problems, according to one aspect, a "virtual" table based algorithm for form registration includes keywords and content identification and association. Within a table, there may be unified rules for keywords and content associations, reducing the algorithmic complexity of form registration. These rules can facilitate associations between keywords in the first row above and contents in those rows below, or between keywords in a left-hand column and contents in the right columns. In one aspect, these rules can facilitate these associations even in a complicated table with subdivided cells, using cell information such as width and height alignment.

BRIEF DESCRIPTION OF THE DRAWINGS

FIG. 1A shows an example of a blank form; FIG. 1B shows an identification of portions of the form of FIG. 1A; and FIG. 1C shows a definition of fields in the form of FIG. 1A;

FIGS. 8A-8D show examples of associations of keywords and content according to embodiments;

FIG. 9 shows additional aspects of form identification and construction according to an embodiment;

DETAILED DESCRIPTION

Figure 2A:
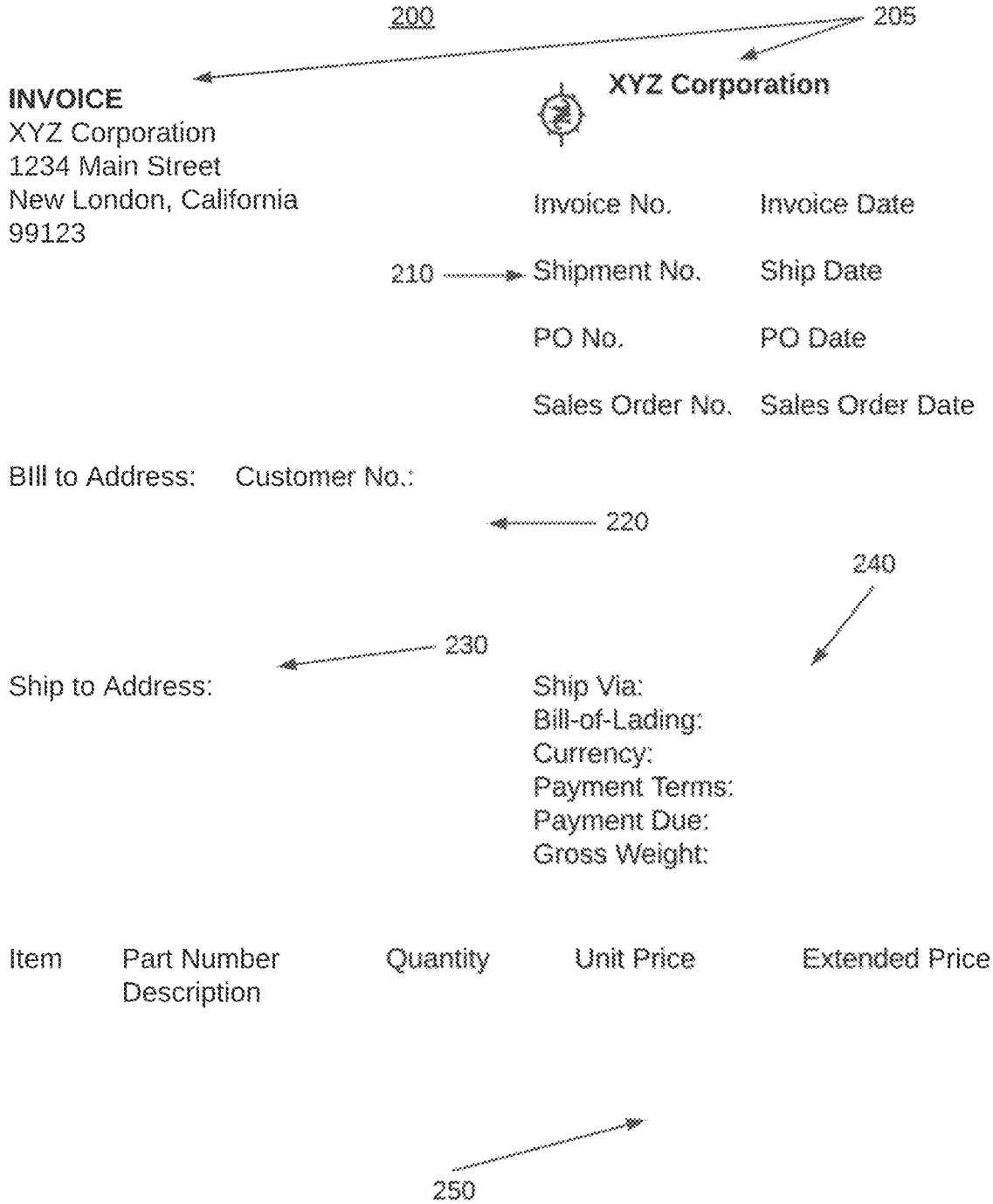
FIG. 2A shows an example of another blank form.

As will be described in more detail herein, aspects of the invention relate to a form auto-registration method, and to a form auto-registration system employing the method. In an embodiment, the form auto-registration system comprises:
one or more processors;
one or more non-transitory memory devices; and
a deep learning system which implements a deep learning model.

In an embodiment, the form auto-registration system stores one or more programs containing instructions which, when executed, perform the following:

responsive to an input of a form, extracting one or more features from the form;

using the deep learning model, distinguishing text from other features in the form, and distinguishing table structures from other features in the form;

classifying keywords and content from the distinguished text;

generating a virtual table using the extracted features;

associating the content with the keywords in the generated virtual table;

outputting the keywords and their associated content as pairs.

In an embodiment, a keyword may occupy a field in a blank form, and content may occupy one or more fields in a filled-in form.

In an embodiment, the above-mentioned associating may comprise determining that content is associated with a particular keyword by identifying a lowest cost value $C_{ij}$, wherein $C_{ij}$ may be determined as follows:

$$C_{ij} = \alpha \cdot G_{ij} + \beta \cdot S_{ij}$$

$\alpha, \beta$—weights $$G_{ij} = \sqrt{(x_i - x_j)^2 + (y_i - y_j)^2}$$

$x_i, y_i$—Position of Keyword i
$x_j, y_j$—Position of Content j
$G_{ij}$—Geometric Distance between keyword i and content j
$S_{ij}$—Semantic Distance between keyword i and content j.

In an embodiment, the above-mentioned semantic distance $S_{ij}$ may be computed as a distance selected from the group consisting of a geometric distance, a forward rank (FR), a backward rank (BR), an arithmetic average of FR and BR, a geometric average of FR and BR, an harmonic average of FR and BR, a Euclidean distance, a word mover's distance, or a cosine distance.

In an embodiment, the semantic distance $S_{ij}$ may be computed as follows:

$$S_{ij} = \sqrt{\sum_{i=0}^{n}(m_n^i - n_n^j)^2}$$

$m_n^i$ – Keyword i $n_n^j$ – Content j.

In an embodiment, the above-mentioned method may store the outputted pairs of keywords and their associated content in a database.

In an embodiment, the above-mentioned method may assign one of a flag "keyword" or a flag "content" to a text item responsive to the classifying.

In an embodiment, the above-mentioned method may adjust one or both of the weights $\alpha, \beta$ in response to a determination that an outcome of the associating is incorrect.

In an embodiment, the generating may comprise aligning keywords and content in the virtual table by aligning bounding boxes around respective keywords and content.

In an embodiment, the deep learning model may be a convolutional neural network.

FIG. 1A shows one example of a blank lined form, with keywords in various positions in the form. In some cases, keywords are at the left-hand side of the form, in the left-hand side of their respective fields. In other cases, keywords are in the middle of their respective fields.

FIG. 1B shows one example of the blank form of FIG. 1A with data filled in. In FIG. 1B, the part number/name of the item being ordered is shown under the field "Widget". The quantity of the item being ordered is shown under the field "Quantity". The price of the item is shown under the field "Price". The total is shown under the field "Total". There are a number of lines under each of the just-mentioned fields. There is respective content to the right of each of the keywords "Subtotal," "Sales Tax," and "Total".

A deep learning system provided with training sets to include a plurality of blank forms, as in FIG. 1A, and training sets to include a plurality of filled in forms, as in FIG. 1B will discern that, when a plurality of blank forms are provided, the substantive content will be keywords. When a corresponding plurality of filled-in forms are provided as further training sets, the deep learning system will discern that data beneath or next to the identified keywords will be content.

FIG. 1C shows the filled in form of FIG. 1B with arrows pointing to where content will go with respect to the various keywords, following the "education" of the deep learning system with training sets of blank and filled-in forms.

From the foregoing, it will be appreciated that embodiments according to the invention can take advantage of deep learning techniques, and mechanisms such as neural networks, more particularly convolutional neural networks (CNN), yet more particularly deep convolutional neural networks (DCNN) or fully convolutional neural networks (FCNN), to recognize patterns of keywords in blank forms, and positioning of content around keywords (e.g. to the right of keywords, or below keywords). With appropriate training sets of blank forms, and blank forms paired with their filled counterparts, it is possible to train a system appropriately to recognize a particular blank form, and to provide appropriate content fields to go with the keywords in the blank form.

The form in FIGS. 1A-1C contains regularly placed fields. Some forms may have regularly-placed fields, with or without lines surrounding the fields. Where there are lines surrounding the fields, the lines may indicate how many lines of content may go with a particular keyword. Other forms may have irregularly-placed fields, with or without lines surrounding the fields. Irregularly placed fields mean that keywords (and thus their associated content) can occur in different places on a blank form.

FIG. 2A shows a blank unlined form 200 with headers 205. The form 200 also has irregularly-placed fields in various locations, including a first set of fields 210, a second set of fields 220, a third field 230, a fourth set of fields 240, and a fifth set of fields 250. One aspect of the blank form of FIG. 2A relative to the blank form of FIG. 1A, besides the absence of lines, are that the FIG. 2A sets of fields are in a number of different locations. A training set of such blank unlined forms will enable a deep learning system to discern that the text in the blank forms comprises or may comprise keywords. As the deep learning system will discern when there are training sets of such forms, filled in, the content will go in different places relative to the various keywords. The system also will discern that some of the text does not comprise keywords.

For forms such as the one in FIG. 2A that do not have visible tables, a known text bounding box grouping technique can be used to form a virtual table initially. The effect can be the same as if the table were visible as in FIGS. 1A-1C. Once the fields are identified, the same kind of rules can be applied as for a visible table.

Figure 2B:
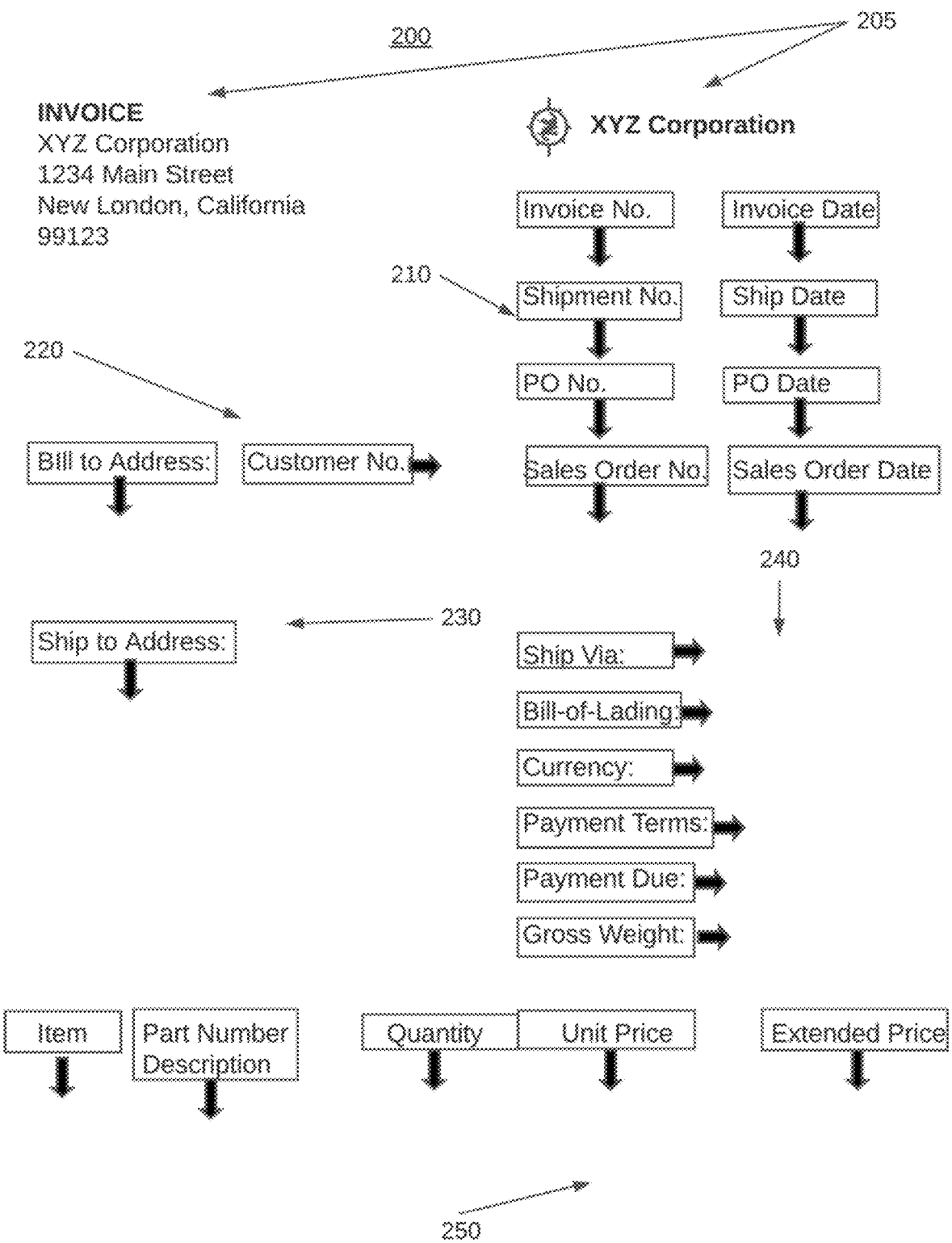
FIG. 2B is an example of the form of FIG. 2A with additional information.

FIG. 2B shows the blank unlined form 200 of FIG. 2A with its associated fields, but with two differences. First, there are boxes around the keywords in the various fields. In an embodiment, these are bounding boxes. Second, there are arrows indicating the position of content relative to the different keywords. In FIG. 2B, there is no arrow underneath the keyword "PO Date". In this circumstance, it is possible that the training sets of filled-in forms provided to the deep learning system did not include content for the keyword "PO Date". It still might be the case, however, that, in use (as contrasted with training), a corresponding filled-in form may have content for that field. The deep learning system still can discern that the presence of data immediately underneath the content "PO Date" connotes content, as the term "PO Date" connotes a keyword. Completion of the use of training sets does not mean that the deep learning system stops its discernment process. Rather, the deep learning system can continue its discernment process, and may alter its evaluation and interpretation of subsequent form data to accommodate such differences.

Figure 2C:
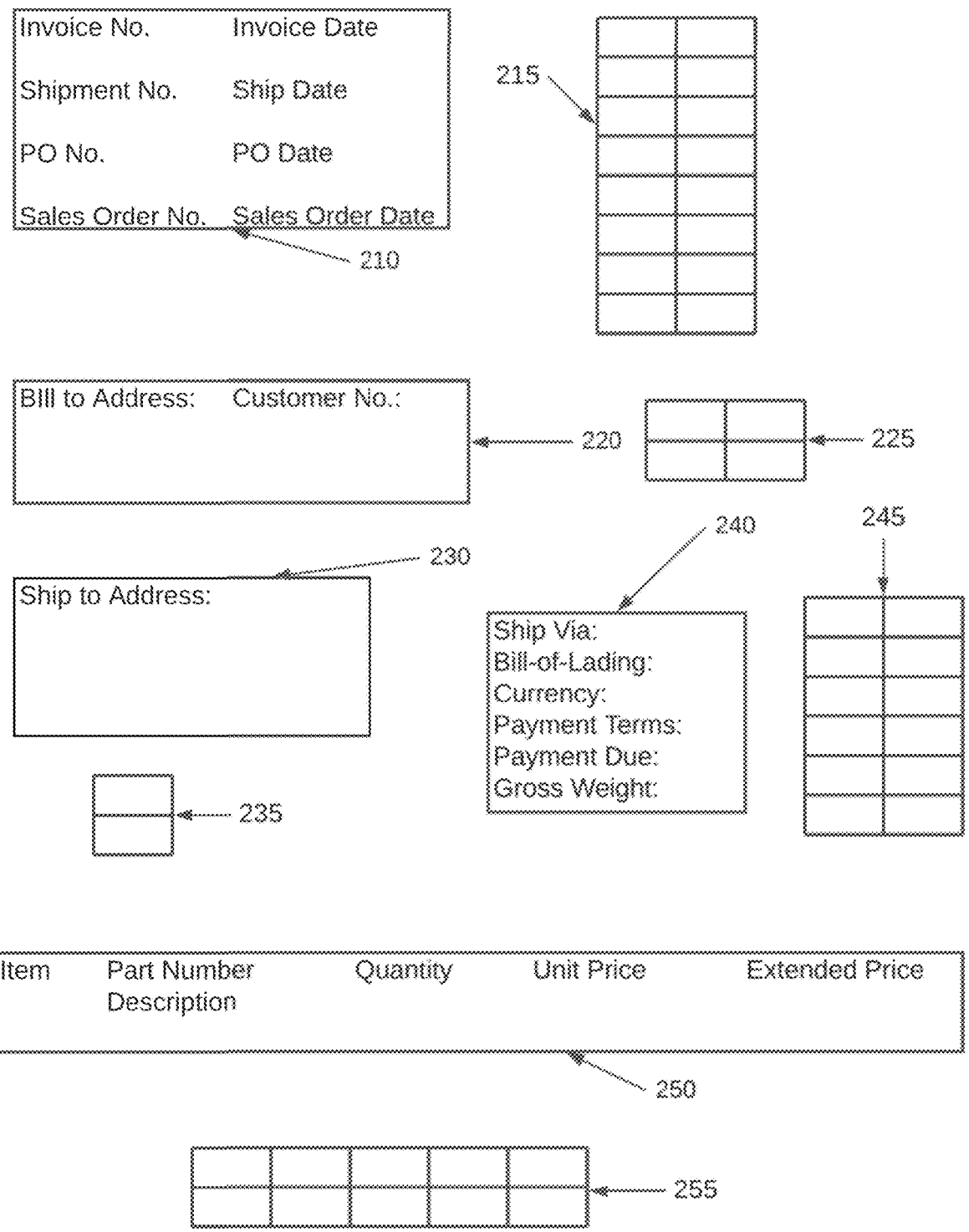
FIG. 2C is an example of the form of FIG. 2A with yet additional information.

FIG. 2C shows the various fields 210-250 with virtual boxes around them to denote general location of both keywords and content in the form 200. Respective sets of boxes 215-255 denote fields and their locations. For example, box set 215 denotes two parallel columns of fields, with a keyword field having a content field immediately beneath it. There are four keyword fields in each column, so there are four content fields respectively below each of the keyword fields. Box set 225 also denotes two parallel columns of fields, with keywords at the top of each column and content beneath each keyword. Box set 235 denotes a keyword field with a content field beneath it. Box set 245 denotes two parallel columns of fields. In box set 245, unlike box set 215 for example, the content fields occur to the right of their respective keyword fields. Finally, box set 255 has five parallel columns of fields, with keywords at the top of each column, and content below each keyword.

Figure 2D:
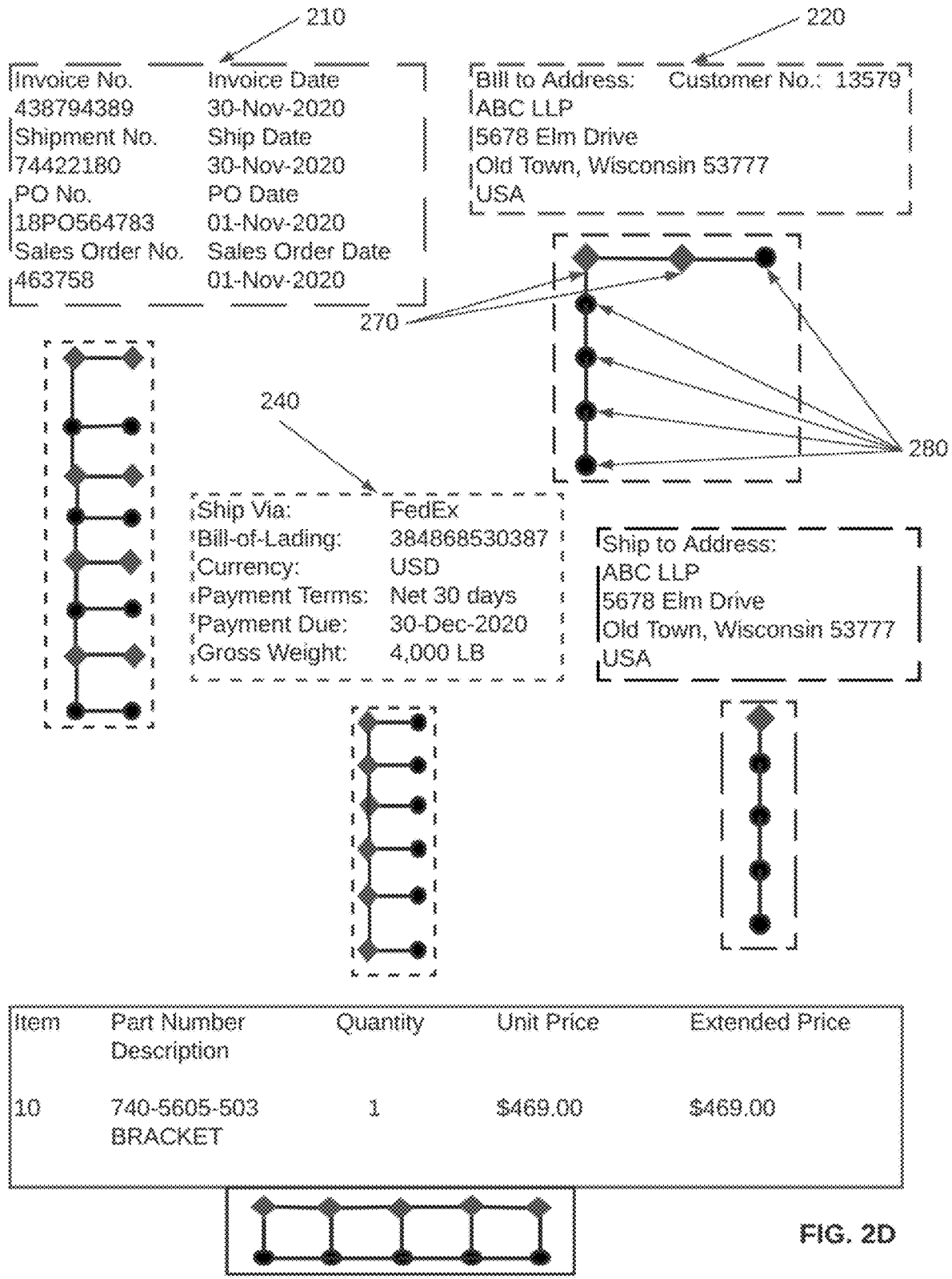
FIG. 2D is a yet further example of the form of FIG. 2A with further information.

FIG. 2D shows another view of fields 210-250 with both keywords and content. Looking at field 220 merely by way of example, dots 270 denote keywords, and dots 280 denote content. In field 220, there is content to the right of one of the keywords ("Customer No.:"), and content below another of the keywords ("Bill to Address:"). In the case of field 220, content, here an address, takes up four lines below the keyword. Similarly, in field 210, there are columns of keywords with content right below each keyword. In field 240, there are six rows of keywords with content right next to each keyword. In each instance, the relative position of keywords and content are similarly denoted by respective dots 270, 280. From suitable training sets and from subsequent input forms, a deep learning system will discern differences in locations and substance between keywords (denoted by dots 270) and content (denoted by dots 280), and accordingly will locate the keywords and content successfully.

Figures 3A, 3B:
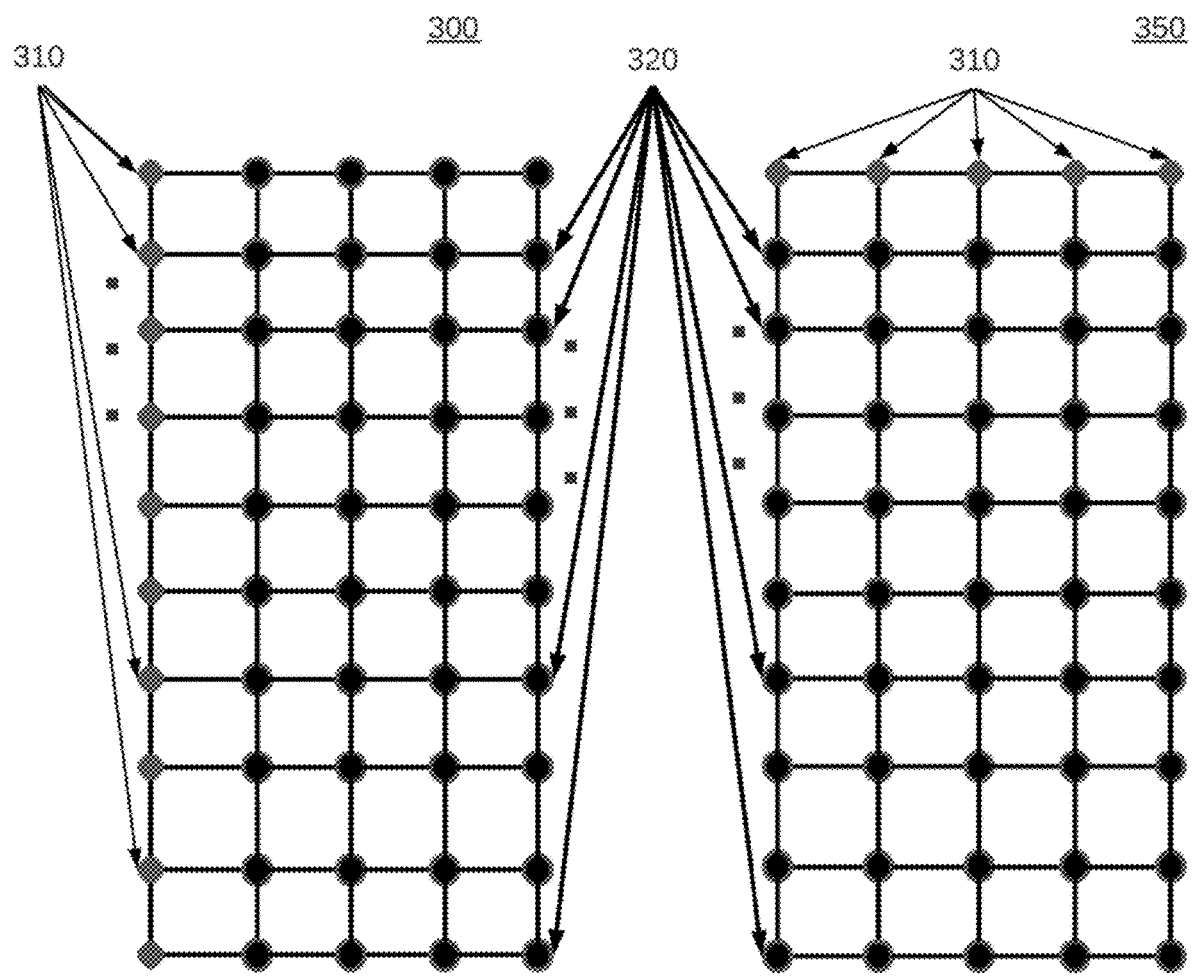
FIGS. 3A and 3B show aspects of form identification and construction according to an embodiment.

FIGS. 3A and 3B respectively show sets of fields 300, 350. In FIG. 3A, keyword fields 310 (denoted by shaded diamonds) run down the leftmost column, and content fields 320 (denoted by black circles) run to the right of each keyword field 310. In FIG. 3B, keyword fields run across the topmost row, and content fields 320 run below each keyword field 310.

In accordance with embodiments, a deep learning based model can extract text, table features for keywords, and content classification. A natural language processing (NLP) classifier then can classify the keywords and content. Virtual table generation algorithms can apply this information to form virtual tables. Within such virtual tables, each keyword can be associated with content using global information from both geometrical and semantic information, as will be discussed in more detail below. Subsequently, the keyword and content pairs can be formed and can be extracted for database input.

In one aspect, keywords and associated content can be identified initially using a deep learning based model, such as a neural network, as a classifier to classify keywords and content. Initially, keywords may be turned into word vectors generated by a word embedding matrix which can be trained through the deep learning based model. Texts with similar meanings may be converted into vectors that have small cosine distances between them. In one aspect, a set of text can form a keyword dictionary. In an embodiment, a set of text can form a content dictionary. A content dictionary may be desirable for certain types of input (for example, customer addresses, part or model numbers, and the like) that recur frequently, or can be updated readily. New text can be queried using both the keyword dictionary and the content dictionary. Once the new text is classified, a class flag such as "keyword" or "content" may be assigned using calculated text distances.

For example, where the model extracts multiple digits or numbers, the model may interpret that these belong to the content group, in view of the content dictionary and discerned similarity. Computation of cosine distances also may provide an indication. In an embodiment, cosine distances may be computed by dividing the product of two text vectors by the product of their absolute values.

As another example, the model may understand text such as "Invoice Number" and "Shipping Number" to be keywords, in view of the keyword dictionary and discerned similarity, and may classify these texts accordingly. Computation of cosine distances also may provide an indication.

Ordinarily skilled artisans will appreciate that training sets of forms used to enable differentiation between keywords and content will need to be sufficiently robust for the network to learn how to recognize keywords in a form. Then, in use, the system will identify content to the right of a keyword, or below a keyword, when a filled-in form is input.

Figure 4:
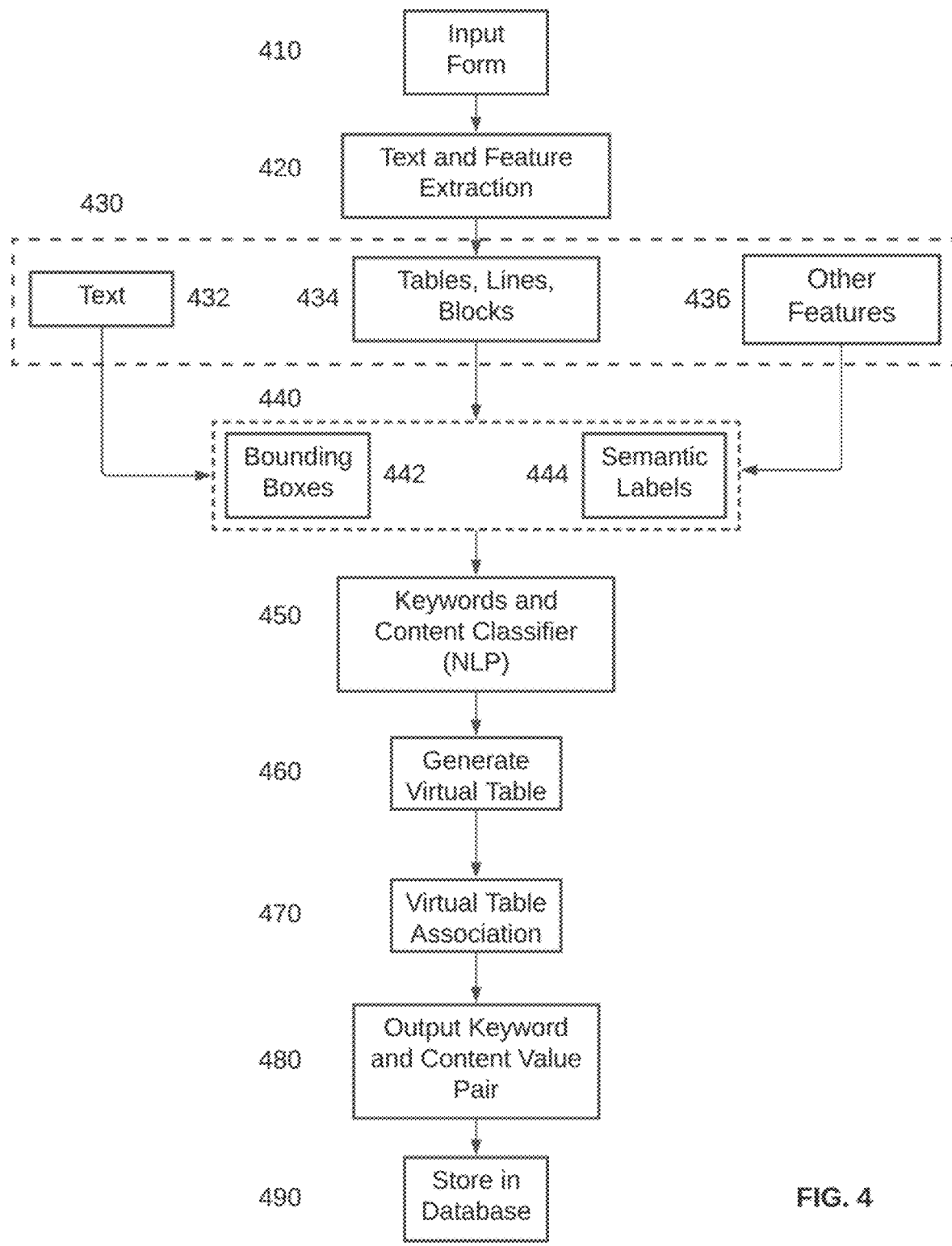
FIG. 4 is a flowchart depicting sequences of operation of form definition and identification according to an embodiment.

FIG. 4 depicts aspects of the general flow for the just-mentioned process. The flow holds for both training of the deep learning model (for example, a neural network, such as a convolutional neural network or a deep convolutional neural network, among others), and for use of deep learning. Looking at FIG. 4, at 410, a form may be input. There may be training sets of blank forms or filled-in forms. A new blank form may be input and may be read as part of the use of the system. If the system detects something new about the blank form that needs to be added to the system's knowledge, the system may treat the input blank form as additional training. Similarly, a new filled form may be input and may be read as part of the use of the system. If the system detects something new about the filled form that needs to be added to the system's knowledge, the system may treat the input filled form as additional training.

At 420, the system may extract both text and features. For example, referring back to the exemplary blank form of FIG. 1A, text such as a header ("Widget Order") may be identified for extraction as well as other text which may be keywords. The form's lines, which may look like a table, also may be extracted as features. Looking at the exemplary filled form of FIG. 1B, the entries under the keywords may be extracted as content. Referring back to the exemplary seemingly formless blank form of FIG. 2A, various fields may be extracted, and identified as headers (element 205), or keywords (fields 210-250). Looking then at FIG. 2D which has content underneath keywords in fields 210-250, the entries underneath those keywords may be extracted as content.

At 430, there is some detail about the extraction of text and features in 420. In an embodiment, a deep learning model may be employed. The particular deep learning model may be selected from a number of techniques, some involving neural networks, including various types of convolutional neural networks. At 432, text (which would include not only words, but also letters, numbers, or symbols) may be extracted from any of the headers, keywords, or content. (In this description, "text" generally refers to items that can appear as keywords or content. Ordinarily skilled artisans will be aware of references to items such word embedding matrices, where "word" also can refer to items that can appear as keywords or content. Ordinarily skilled artisans reading this description will understand and appreciate the context of what is being referred to herein when "text" or "word" is used.) At 434, structures in which text may be found can be extracted. In the case of forms, there may be relatively regularly organized data, such as in FIG. 1A, which may be characterized as a table, or relatively "randomly" organized data, such as in FIG. 2A, which may be characterized as a plurality of tables or a plurality of fields (which may be treated as a corresponding plurality of blocks). Keywords or content (not yet specifically identified as such at this point) may appear in individual lines within a table, or a field, or a block. Whatever the structures in which the text may appear, those structures can be extracted. At 436, other features, such as decorations, icons, or other objects that may be present on a form, may be extracted.

At 440, classification may be performed. At 442, for example, where forms may have data located irregularly in different fields disposed throughout, a bounding box technique can be used to identify text. At 444, a semantic label can be applied to the text in each bounding box. Thus, for example, the location of a particular bounding box on the form may identify the contents of the bounding box as keywords, or as content.

At 450, using natural language processing (NLP), the labeled keywords and content can be classified. In an embodiment, a deep learning technique such as a neural network or a type of convolutional neural network may be used. Then, at 460, with the keywords and content classified appropriately, and the other information about the form available, a virtual table may be generated. At 470, elements of the table, as a virtual table, may be associated with each other, to provide keywords and their associated content. At 480, a pair of keyword and its corresponding content may be output. At 490, the keyword/content pairs may be stored in a database.

Looking now at the implementation of aspects of the flowchart of FIG. 4, by way of brief background, many accounting forms, such as the lined ones shown in FIGS. 1A-1C, contain visible tables with rows and columns. With lined forms, sometimes the tables may not have all of their row and/or column lines, either boundary lines or internal lines. Partial or complete lines may be missing for various reasons, for example, because of printing or scanning, sheet damage, or because the lines are handwritten. Sometimes tables do not have specific lines, but instead rely on differently colored or shaded blocks to distinguish among table cells, table rows, and/or table columns.

The following discussion describes approaches to effectuating 434 and, in some instances, 436 in FIG. 4. Using techniques such as deep learning, including neural networks, convolutional neural networks (CNN), or deep convolutional neural networks (DCNN), it can be feasible to extract table lines not only from visible lines but also from gradient information such as colored or shaded blocks, damaged or otherwise incomplete lines, or handwritten lines. Using the detected lines, it can be possible to form tables.

Figure 5A:
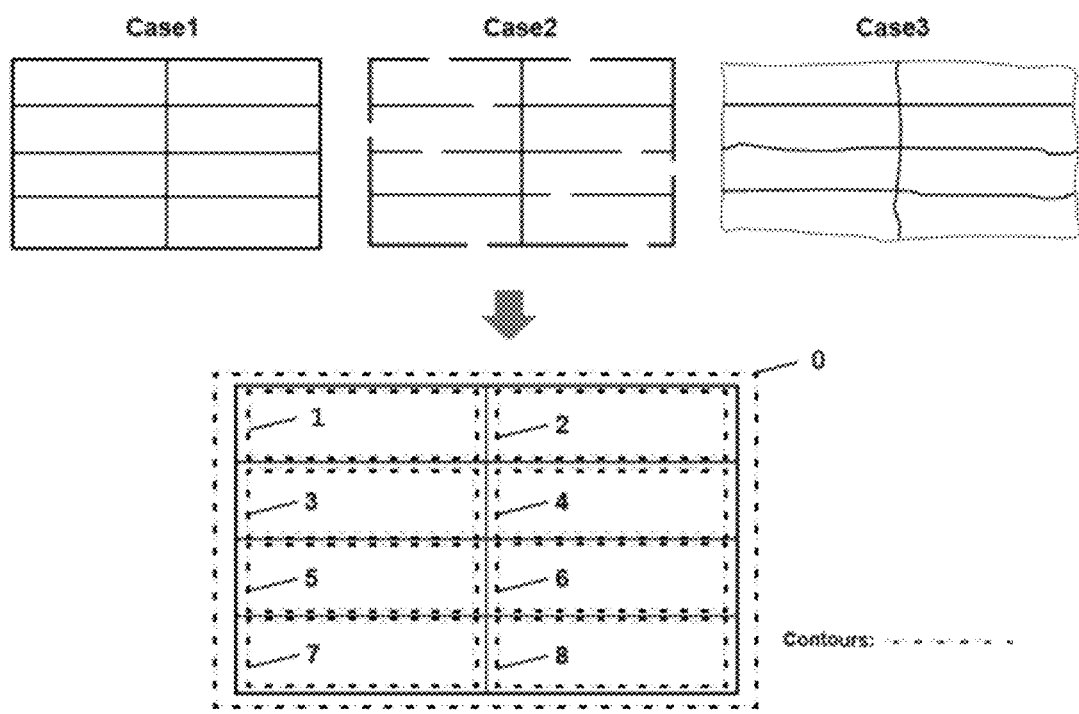
FIGS. 5A and 5B show additional aspects of form identification and construction according to an embodiment.

Looking at FIG. 5A, Case1 shows a very high level example of a high quality form with no line or pixel degradation. In such a situation, it is relatively straightforward to extract the resulting table using a contour based rectangular shape regression technique. Case2 shows lines with some missing portions, as an example of degraded table lines. In an embodiment, a line detector may be used to fill in the missing portions before extracting the table using the above-referenced regression technique. Such an approach can work for a limited amount of degradation. Case3 has significantly more irregularities, including wavy or light lines. Irrespective of the cause of these irregularities (e.g. handwriting, poor scanning quality), a traditional line detector using a regression technique like the one mentioned above may fail. For example, a rectangular shape regression technique can fill in missing portions of otherwise straight lines, as in Case2. However, the wavy or irregular lines in Case3 may not be recognized, and so may not be resolved with a rectangular shape regression technique.

With proper training data, a CNN or a DCNN can handle all of Case1, Case2, and Case3, identifying line or table features for each of these cases. With proper detection, the contour 1. In that event, a DCNN may be required to train and detect the line or table features. Then, it is possible to draw a regular table and apply the contour regression. The lower portion of FIG. 5A shows a grid with properly filled in lines, with dotted lines signifying respective boundaries of individual cells in the grid. An overall rectangle (denoted "0") is drawn around the lines themselves.

Figure 5B:
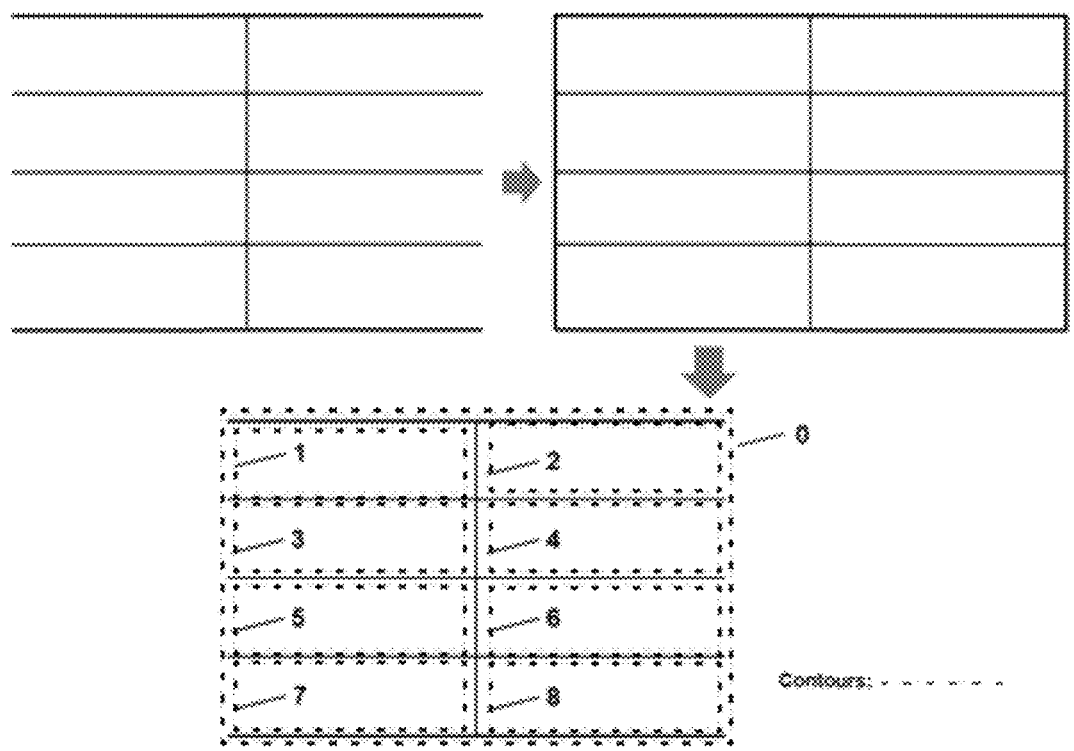

FIG. 5B shows an example in which a table may not have sides (outer vertical lines). Such a table may be considered to be non-traditional. Cell extraction still is necessary, however, and so contours of the cells need to be identified, as they are in FIG. 5A. In order to process such a table, in an embodiment contour regression techniques may be applied to identify an overall rectangle (denoted "0") around the lines themselves. Alternatively, with proper training data, a CNN or a DCNN can handle this situation by identifying contours of the cells. The rectangle 0 may be drawn on top of the original table in order to convert the non-traditional table into a traditional table. Subsequent processing then can proceed in the same manner as with a traditional table, with individual cells defined similarly to FIG. 5A.

Figure 6A:
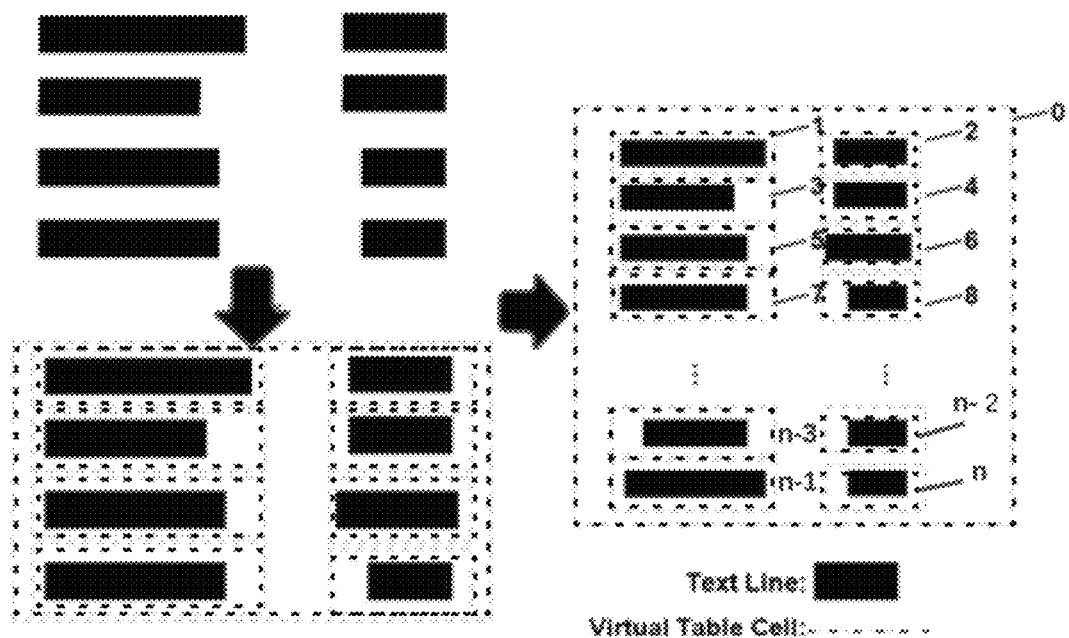
FIGS. 6A and 6B show additional aspects of form identification and construction according to an embodiment.

The upper left most portion of FIG. 6A shows a table without any visible features. The lack of visible features in the table can make it difficult to associate text appropriately (whether keywords or content). What might be cells of a table are shown as black boxes, which are of different widths. These black boxes signify text lines. The text lines may be of different sizes for different reasons. For example, the length of the text (number of characters) could be different for different text lines, leading to different text line lengths. Additionally or alternatively, the text could be handwritten, and of inconsistent size within a given text line, thereby also leading to different text line lengths.

In FIG. 6A, following the downward arrow to the lower left most portion of FIG. 6A, a box (shown as a dotted line) may be drawn around the entire table. Bounding boxes for each cell also may be drawn. In an embodiment, a CNN or DCNN generates the bounding boxes. In one aspect, because the black boxes on the left hand side are wider than the black boxes on the right hand side, the bounding boxes (dotted line boxes) on the left hand side may be wider than the bounding boxes (also dotted line boxes) on the right hand side.

Following the rightward pointing arrow to the right hand side of FIG. 6A, there is a virtual table which is constructed from the bounding boxes. As noted previously, in an embodiment the extracted text lines come from CNN or DCNN outputs. The text lines may be grouped using similar table cell labels: (here, cells 1, 2, 3, . . . , n−2, n−1, n).

Figure 6B:
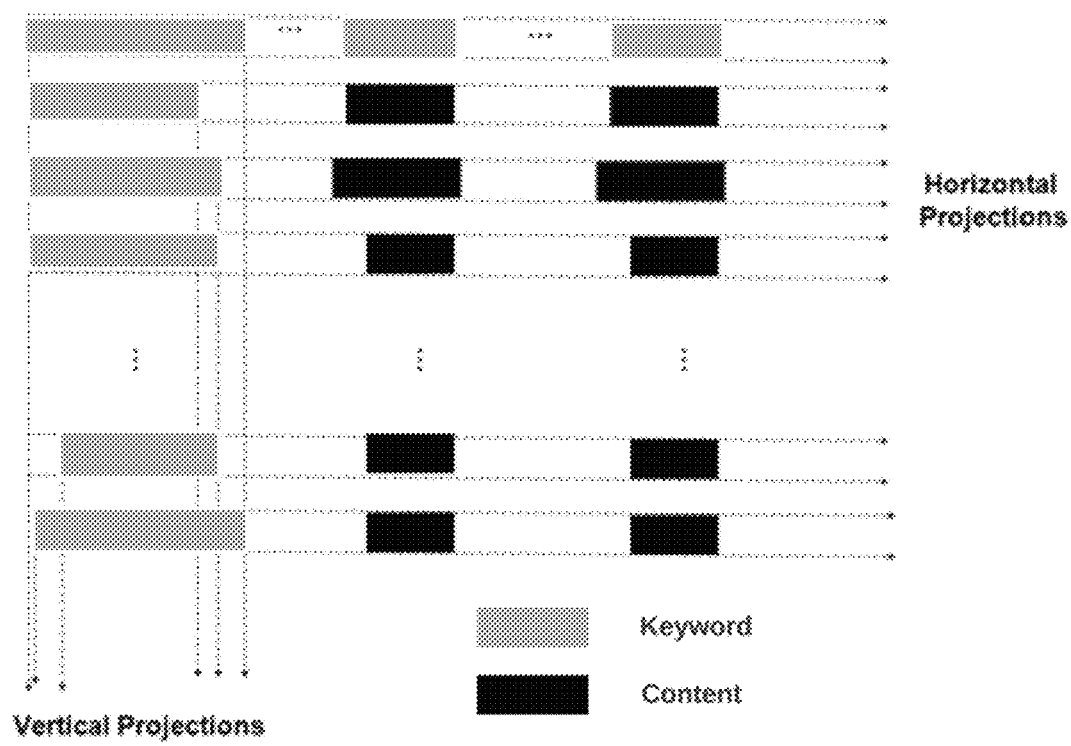

FIG. 6B shows another aspect of using text lines to define cells in a generated table. In an embodiment, a column may be derived by observing vertical projections of text lines within that column. Within a given column, the widest text line may be used to define widths of bounding boxes for that column. Similarly, a row may be derived by observing horizontal projections of text lines within that row. Within a given row, the tallest text line may be used to define heights of bounding boxes for that row. It should be noted that in FIG. 6B, keywords and content within the defined table also are identified. In this case, keywords run across the top row of the table, and down the left hand column.

Figure 7A:
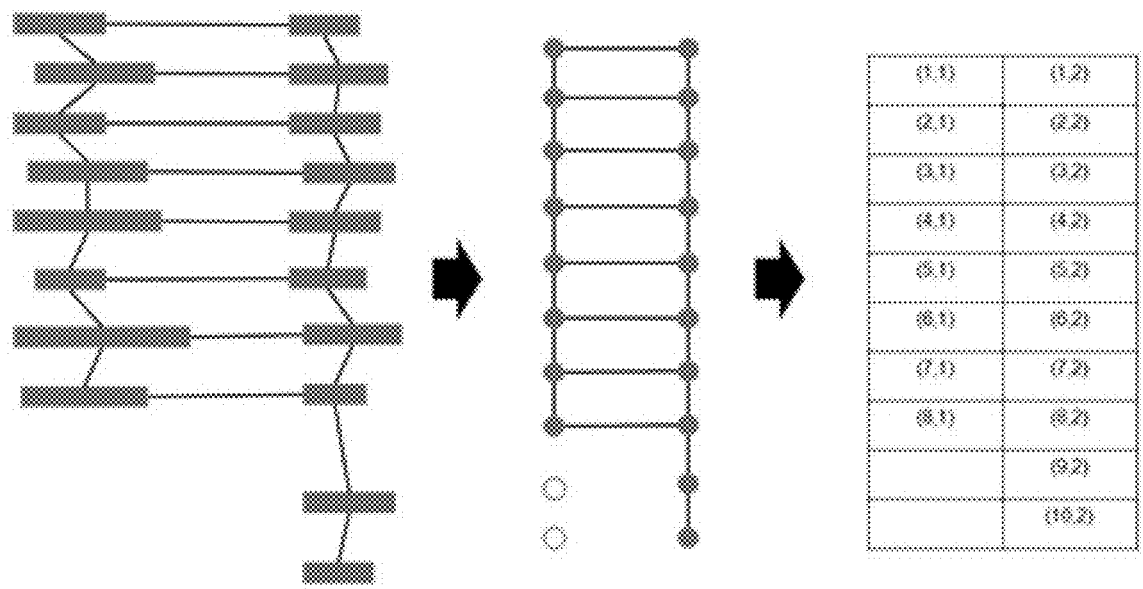
FIGS. 7A and 7B show yet additional aspects of form identification and construction according to an embodiment.

Once columns and rows and the text lines within those columns and rows are identified, it may be necessary to align the text lines to form a table. FIG. 7A shows an example of such an alignment, in which the text lines at the left-hand side of FIG. 7A are not aligned. The middle portion of FIG. 7A shows an aligned grid. The right-hand side of FIG. 7A shows ordered numbering for the grid as ordered pairs, with the first number of an ordered pair being the row, and the second number being the column. In FIG. 7A, it should be noted that there are no text lines in the last two rows of the left most column. Accordingly, the aligned grid does not have indicators of text lines in those positions. Blanks are provided to help alignment of columns and rows. There are no ordered pairs in those positions in the ordered numbering.

Figure 7B:
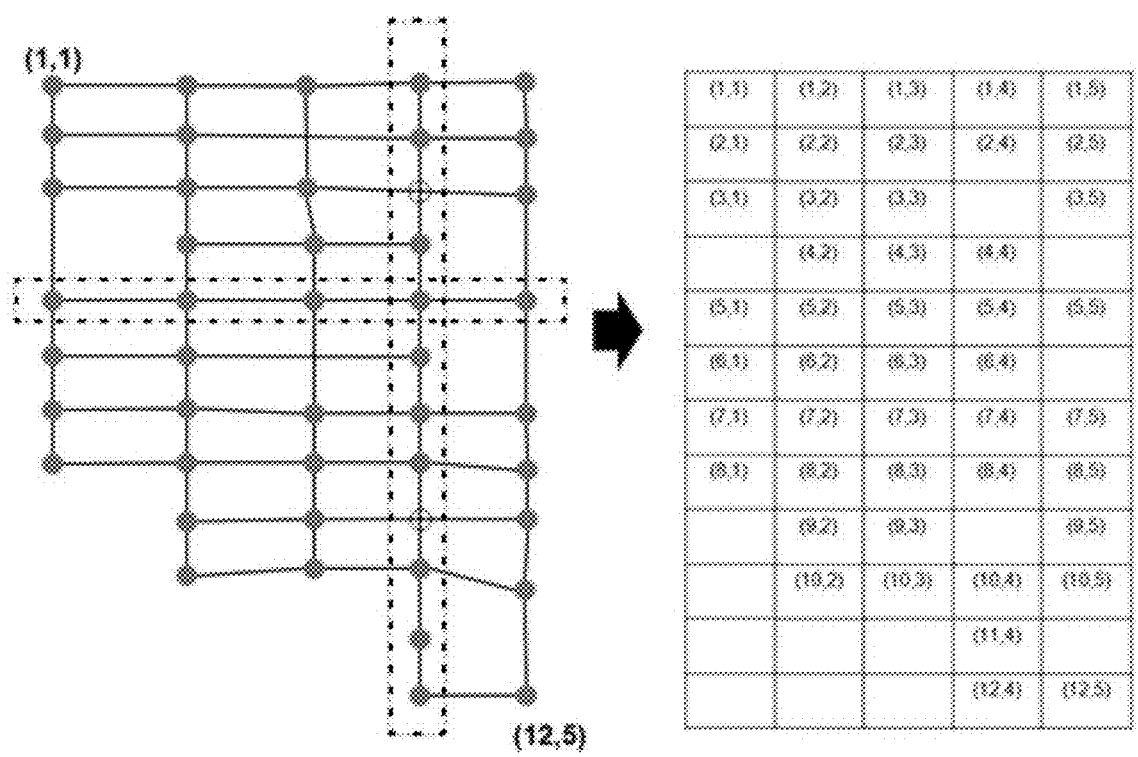

FIG. 7B shows a distribution of text lines with different numbers of text lines in some rows and some columns. In an embodiment, a maximum number of text lines in a row (here, five), and a maximum number of text lines in a column (here, 12) are identified. In this fashion, the overall ordered pair table can be provided suitably, with blanks where there are no text lines, similarly to FIG. 7A.

FIGS. 8A-8D depict a sequence for identifying keyword-content pairs. In an embodiment, starting with FIG. 8A which shows an example of keywords (diamonds) and content (circles), dotted line boxes are drawn around associated keywords and content. At the top of FIG. 8A, a keyword appears to have a keyword below it, and content to the right of it. At the bottom of FIG. 8A, a keyword appears to have a keyword above it, and content to the right of it. FIGS. 8B and 8C focus on these two pairs. In an embodiment, starting with what can be called corner to corner, or C2C cases, a keyword at a corner can be considered a deterministic keyword. In FIG. 8A, there are two such deterministic keywords. Those two deterministic keywords, as shown in FIGS. 8B and 8C, are paired with the closest content, and are removed from further evaluation. With those keyword-content pairs removed, the keyword immediately below the topmost one, and the keyword immediately above the lowermost one become deterministic keywords, and are paired with the closest content, and then similarly are removed from further evaluation. This process continues until all keywords have been associated with content. FIG. 8D depicts the final keyword to be paired with content.

In FIG. 8A, There is one keyword, 810, which has content 812 immediately to the right and content 814 immediately below. Following the left-to-right and top-to-bottom rules discussed previously, both content 812 and content 814 will be paired with keyword 810.

Figure 9:
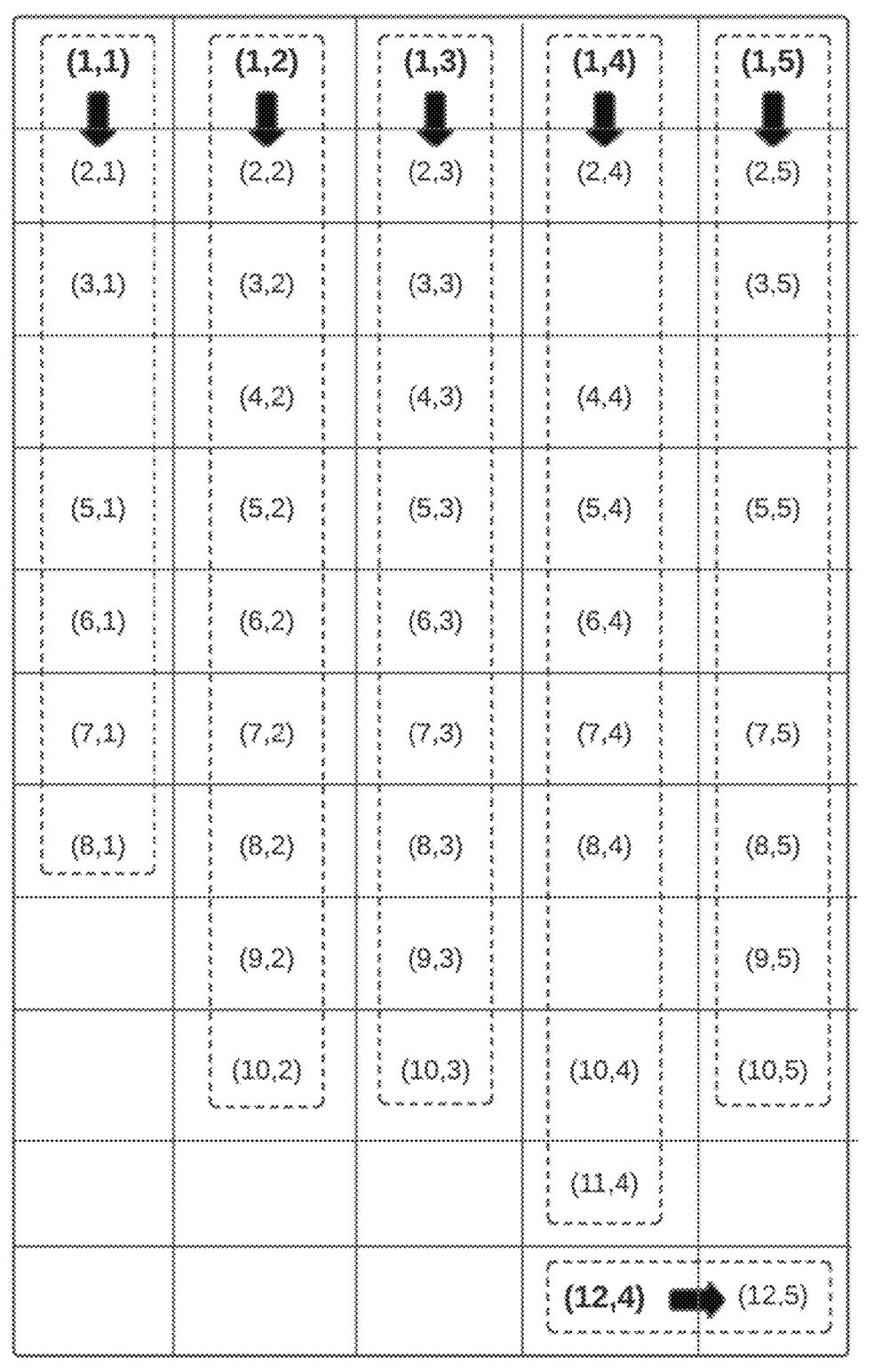

FIG. 9 shows a table of ordered pairs in which bold-faced entries are identified keywords, and the remaining entries are identified content. In an embodiment, a global association process is used, along with a local searching method. Using the top-to-bottom and left-to-right rules discussed previously, contents may be paired with keywords in the table. Accordingly, in FIG. 9, the keyword in position (1,1) is paired with the content in the next seven rows in the same column. Here, it may be noted that there is no content at position (4,1). For content in positions (5,1) to (8,1), the closest keyword above is at position (1,1), so those last four pieces of content get paired with that keyword. The keyword in position (1,2) is paired with the content in the next nine rows in the same column. The keyword in position (1,3) also is paired with the content in the next nine rows in the same column. The keyword in position (1,4) is paired with the content with content in the next ten rows in the column. Here, similarly to the column with keyword (1,1), there is no content at position (3,4) or position (9,4). For the content in positions (4,4) to (8,4) and (10,4) to (11,4), the closest keyword above is at position (1,4), so those last seven pieces of content get paired with that keyword. The keyword in position (1,5) is paired with the content in the next 9 rows in the same column. Here again, as with two of the other columns just discussed, there is no content in two of the locations. The keyword at (1,5) being the closest one above the content in this column, all of that content in that column is associated with that keyword.

Finally, there is a keyword at location (12,4). There is one piece of content to the right of this keyword, at location (12,5). That content gets paired with the keyword at location (12,4), because that keyword is the closest one in distance to that content, certainly closer than is the keyword at (1,5). Thus, even though the content at location (12,5) is in the same column as the keyword at location (1,5), following the left-to-right rule, the content is paired with the keyword immediately to its left, at location (12,4). Also, although keyword (12,4) is the same column as keyword (1,4), keywords will not be paired together.

To associate each keyword with its content, it may be possible to use virtual table information, and to break down such a virtual table into rows and columns. For each column or row, there will be a keyword and content distribution pattern, which may be discerned based on training sets that a CNN or a DCNN, as exemplary deep learning systems, may use. In this manner, corresponding keyword and content pairs/sets may be identified. Each such pattern, whether in a column or in a row, may be segmented into a group comprising a keyword and its associated content. There may be instances of repeated keyword and content pairs. Such pairs may be treated similarly. In an embodiment, in a more general association policy, a keyword and content pattern may be divided into small segments according to different neighboring text. In one aspect, each segment may start with a keyword group, and may stop until a new keyword appears.

In forms and in other types of documentation, the number of keywords and their associated content will be different. In order to associate each keyword with its content and to enable proper use of the algorithm to be described later, in one aspect it is desirable, and sometimes necessary to balance the size of the keyword group and the size of the content group. For example, there may be four keywords, each at the top of a respective column, that may be associated with respective content in each column. Accordingly, within a group of a keyword and its content, the content in a given column may be referred to as "subcontent". Thus, with four columns, there may be four groups of subcontent, with content in each group matched with its associated keyword in that group.

Three different situations may be considered for each column: (1) the numbers of keyword and content are the same; (2) there are more keywords than content (i.e. for one or more keywords, there may be more keywords than content; (3) there is more content than there are keywords. The following discussion addresses the third case, to balance the amount of content for each keyword.

Figure 10A:
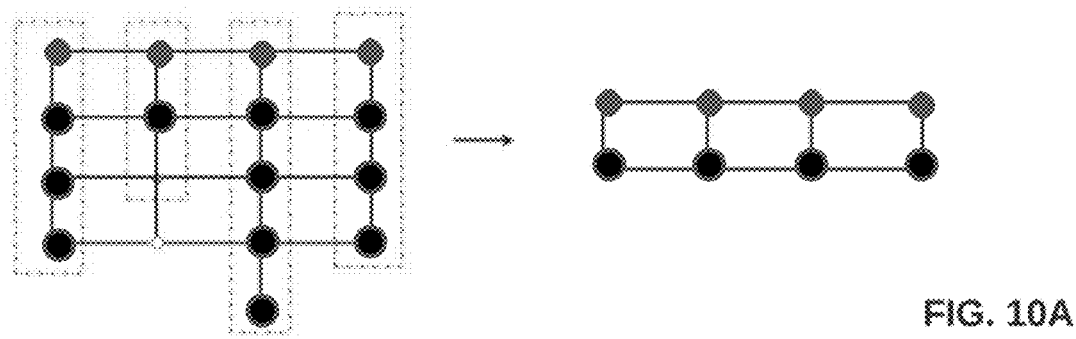
FIGS. 10A-10D depict different arrangements of keywords and content, to be identified and associated according to embodiments.

FIGS. 10A-10D show several possible different examples of case (3). In FIG. 10A, keywords run across the top, with one or more rows of content below each keyword, as the left hand side of FIG. 10A depicts. Shrinking the multiples rows of content into a single row beneath each keyword (effectively, a shrinkage of each column) yields the pattern on the right hand side of FIG. 10A.

Figure 10B:
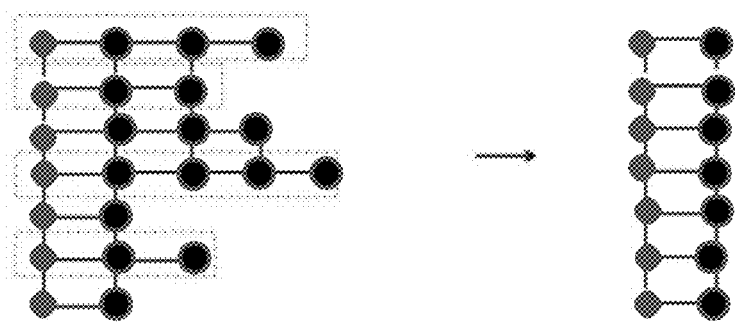

In FIG. 10B, keywords run down in a column on the left-hand side, with one or more column of content to the right of each keyword, as the left hand side of FIG. 10B depicts. Shrinking the multiple columns of content into a single column (effectively a shrinkage of each row) yields the pattern on the right hand side of FIG. 10B.

Figure 10C:
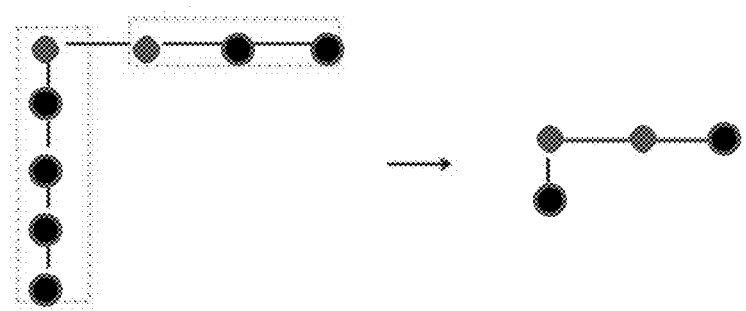

In FIG. 10C, there are two keywords side by side, with one or more items of content in a column below one keyword and one or more items of content in a row or parallel columns to the right of another keyword, as the left hand side of FIG. 10C depicts. Shrinking the content into a single row (effectively, shrinkage of a column) or a single column (effectively, shrinkage of a row) yields the pattern on the right hand side of FIG. 10C.

Figure 10D:
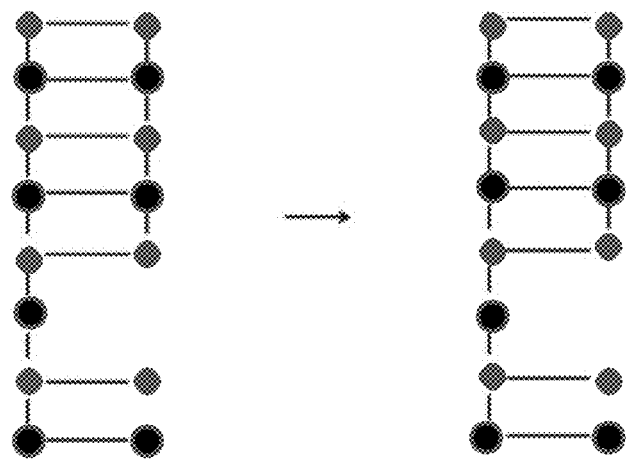

In each of the instances in FIGS. 10A-10C, there are one or more instances of more than one piece of content for each keyword. In such instances, compression of the type shown in these Figures is possible. Looking at FIG. 10D, the arrangement of keywords and content is such that there is only one item of content below each keyword. As a result, the patterns on the left and right hand sides of FIG. 10D are the same, because there is no way to shrink the content associated with a particular keyword.

Figure 11:
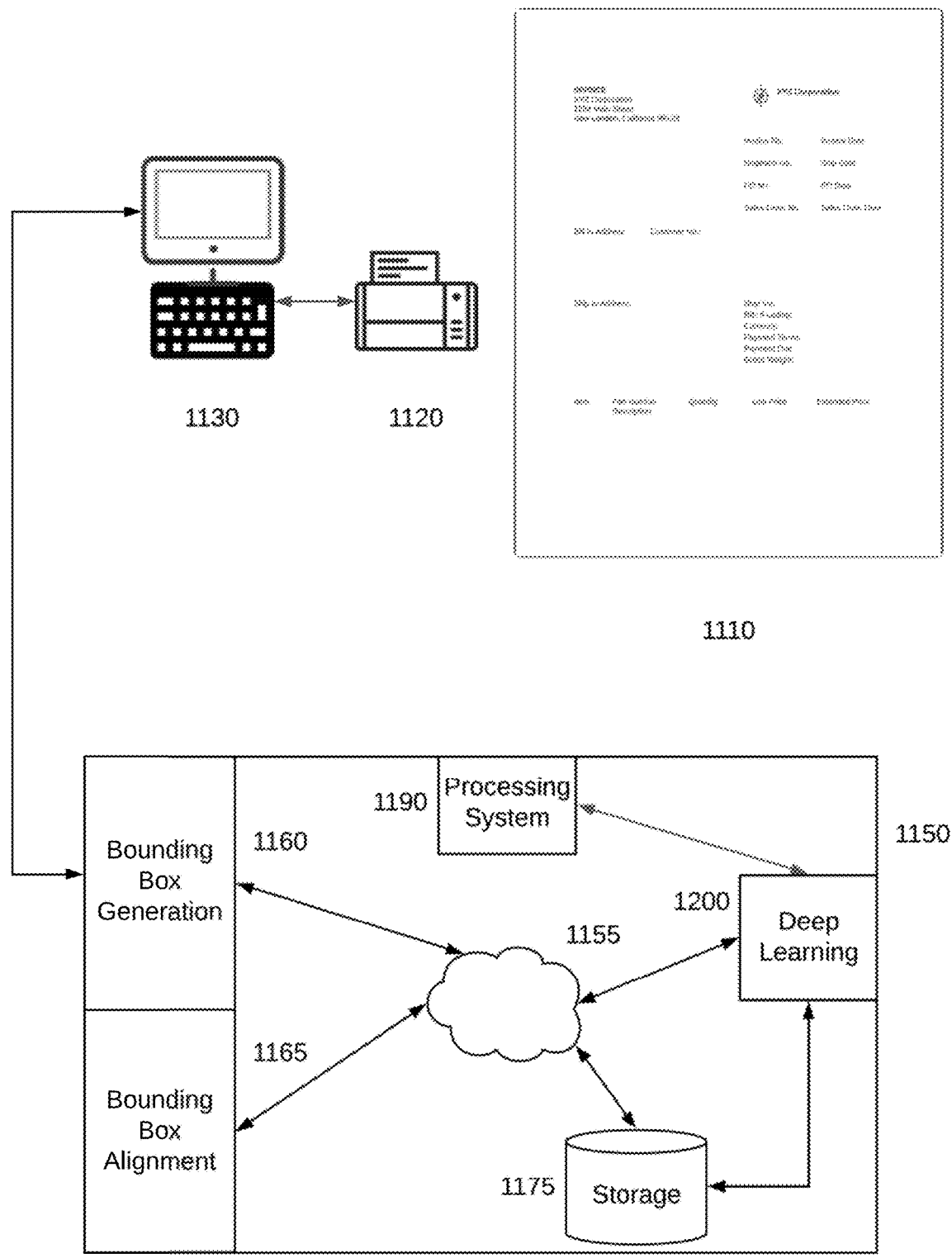
FIG. 11 is a high level block diagram of a system for implementing aspects of the invention according to embodiments.

FIG. 11 is a high level block diagram of a system to implement the method described herein. In FIG. 11, an input form 1110 is input via scanner 1120, which may be connected to computing system 1150 either directly or through other computing apparatus 1130. Scanning input form 1110 produces an input image from which computing system 1150 will identify keywords. Computing system 1150 will include one or more processors, one or more storage devices, and one or more solid-state memory systems (which are different from the storage devices, and which may include both non-transitory and transitory memory). In an embodiment, computing system 1150 may include deep learning system 1200, which will be described in more detail below.

Where deep learning system 1200 is involved, a training set may include blank forms, from which the deep learning system can discern locations of keywords. Once deep learning system 1200 is able to discern locations of keywords, different blank forms can be input, and deep learning system 1200 will be able to discern keyword locations. The system 1200 also may be trained on filled-in forms, where keyword locations may be known. Where text is provided on the filled-in forms adjacent to keywords, the system 1200 can be trained to recognize that text as content. Once the system 1200 is trained, when different filled in forms are input, it then can be possible to discern locations of content associated with respective keywords, based on a location of content relative to a keyword (e.g. either immediately below, or immediately to the right of the keyword).

As part of the discernment of keyword and content location, computing system 1150 may generate bounding boxes around text, using bounding box generation system 1160. In an embodiment, computing system 1150 may include a bounding box alignment system 1165 to align bounding boxes determined to be out of alignment, as for example in FIGS. 6A and 6B, and/or FIGS. 7A and 7B. In an embodiment, storage 1175 may store the input images that deep learning system 1200 processes. Storage 1175 also may store training sets, and/or the processed output of deep learning system 1200, which may include identified keywords and content associated with particular input forms.

Computing system 1150 may be in a single location, with network 1155 enabling communication among the various elements in computing system 1150. Additionally or alternatively, one or more portions of computing system 1150 may be remote from other portions, in which case network 1155 may signify a cloud system for communication. In an embodiment, even where the various elements are co-located, network 1155 may be a cloud-based system.

Additionally or alternatively, processing system 1190, which may contain one or more of the processors, storage systems, and memory systems referenced above, may implement the regression algorithms mentioned herein to resolve locations for keywords and corresponding content. In an embodiment, processing system 1190 communicates with deep learning system 1200 to assist, for example, with weighting of nodes in the system 1200.

Figure 12:
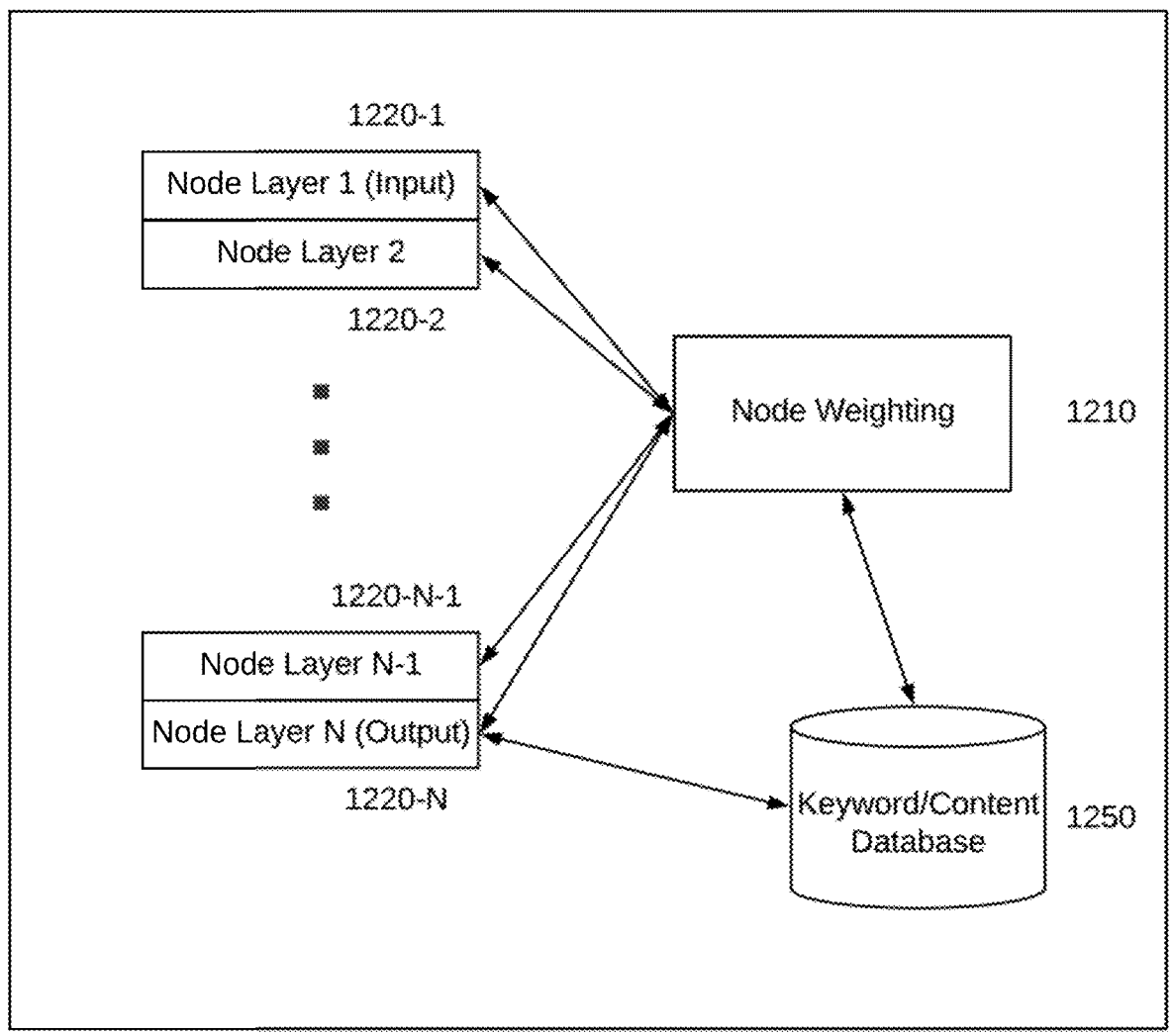
FIG. 12 is a high level block diagram of aspects of the system of FIG. 11.

FIG. 12 shows a slightly more detailed diagram of deep learning system 1200. Generally, deep learning system 1200 will have processor, storage, and memory structure that ordinarily skilled artisans will recognize. A neural network, such as a CNN or a DCNN, will have a plurality of nodes arranged in layers 1220-1 to 1220-N as depicted. Layer 1220-1 will be an input layer, and layer 1220-N will be an output layer. According to different embodiments, N can be two or greater. If N is three or greater, there will be at least one hidden layer (for example, layer 1220-2). If N equals two, there will be no hidden layer.

There will be an initial weighting provided to the nodes in the neural network. The weighting is adjusted, as ordinarily skilled artisans will appreciate, as modifications are necessary to accommodate the different situations that a training set will present to the system. As the system 1200 identifies keywords and content, the output layer 1220-N may provide the keywords and content to a keyword/content database 1250. The database 1250 also may store classifications of forms, with accompanying location of keywords and, where applicable, location of content relative to the keywords.

In an embodiment, once the keywords and content are identified, including in some cases a pattern of keywords and content, the keywords and content in each group may be paired using, for example, a linear assignment solver. According to embodiments, a constraint programming (CP) solver, an integer programming (IP) solver, or a mixed-integer programming (MIP) solver may be used. In other embodiments, a satisfiability (SAT) solver may be used, or a CP-SAT solver. Cost values between each keyword and corresponding content in the group may be computed using both geometric information and semantic information. In an embodiment, a cost $C_{ij}$, which indicates proximity of keywords (i) and content (j) to each other, may be calculated.

The lower $C_{ij}$, is, the more likely the keywords and content are to be associated with each other. An exemplary formula is as follows:

$$C_{ij} = \alpha \cdot G_{ij} + \beta \cdot S_{ij}$$

$$G_{ij} = \sqrt{(x_i - x_j)^2 + (y_i - y_j)^2}$$

$$S_{ij} = \sqrt{\sum_{i=0}^{n}(m_n^i - n_n^j)^2}$$

$\alpha, \beta$ – weights $G_{ij}$ – Geometric Distances $S_{ij}$ – Semantic Distances $x_i, y_i$ – Position of Keyword $i$ $x_j, y_j$ – Position of Content $j$ $m_n^i$ – Keyword $i$ $n_n^j$ – Content $j$ Ordinarily skilled artisans will appreciate that semantic distances can be measured directly by geometric distance, but also can be measured, for example, by forward neighbor rank, by backward neighbor rank, or by an arithmetic, geometric, or harmonic average of the two. In the foregoing equations, the semantic distance is measured as a Euclidean distance. In an embodiment, semantic distance may be measured by a distance measurement known as word mover's distance, which may be applicable when there is no common word in the respective text. Cosine distance also may be a type of semantic distance.

The calculated paired distances can form a cost matrix, in which the column and row correspond to keywords and content. The distances are elements of the matrix. Using a linear sum assignment algorithm, for example, it is possible to find the pairs that have the smallest distances in the matrix. In linear sum assignment, there is a constraint that each row can only be assigned to a column once. Therefore, each keyword can only have one corresponding content or content group to be assigned.

Using the linear sum assignment algorithm to resolve the keyword and content issue, it is possible to obtain the minimum cost of the paired distances. One benefit of the linear sum assignment is that, for each keyword, the constraint is not limited to association of a single piece of content. The algorithm finds all possible pairs that reaches the global minimum and best matches. In an embodiment, the assignment problem may be a so-called "unbalanced" problem, in which case the solver employed may address an unbalanced linear assignment problem.

Figure 13:
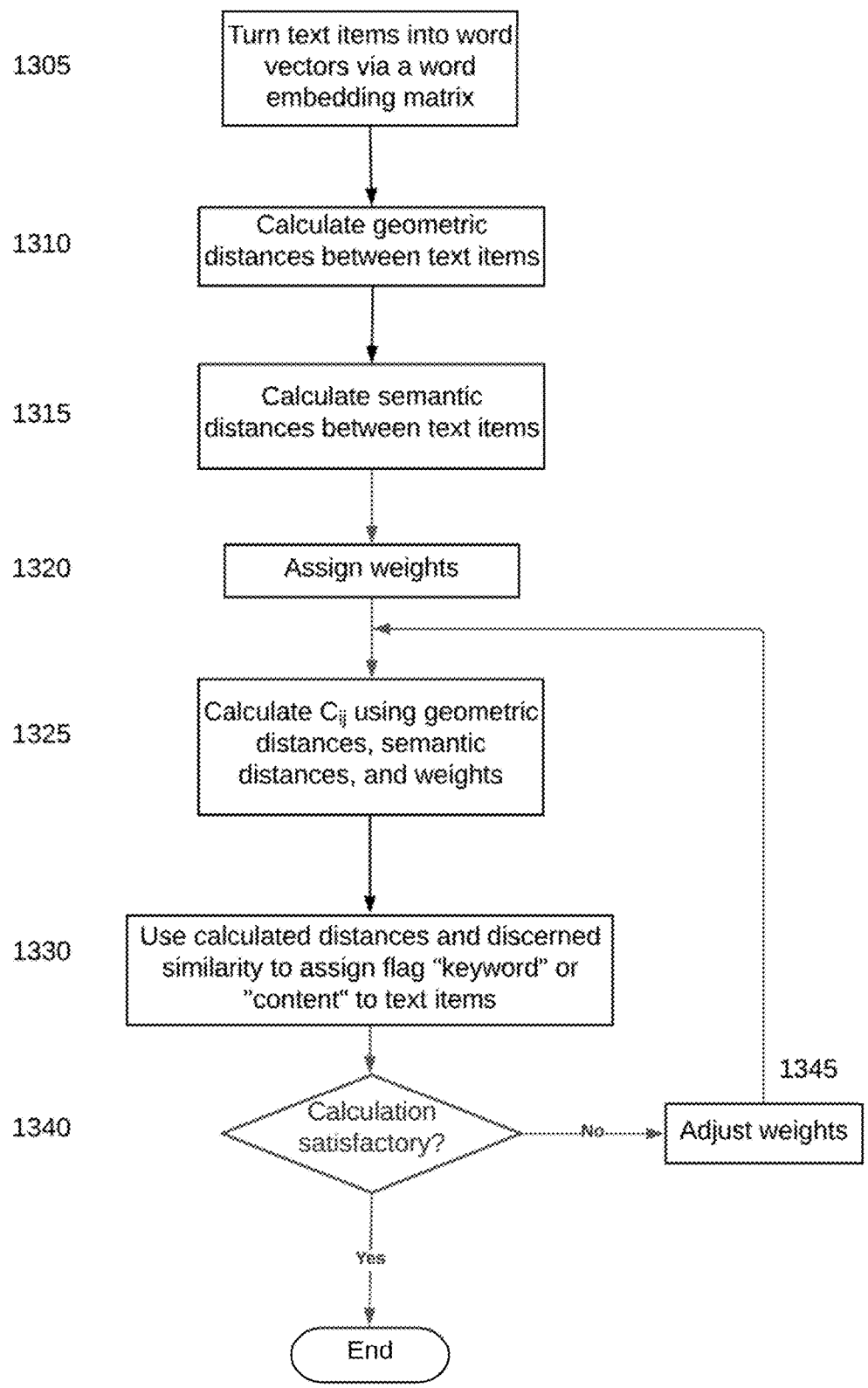
FIG. 13 is a flowchart depicting sequences of operation of determination of keywords and content according to an embodiment.

FIG. 13 summarizes the flow from the preceding discussion. At 1305, text items (keywords or content) are turned into word vectors via a word embedding matrix, which may be trained by a deep learning model using a sufficiently large dataset. Ordinarily skilled artisans will appreciate the machine learning training required, particularly as the matrix can be very large, and can be trained a little at a time, for example, working only on the rows that are relevant at a particular training step. At 1310, the geometric distances resulting from the word vectors determined via the trained word embedding matrix are calculated. At 1315, the semantic distances resulting from the word vectors determined via the trained word embedding matrix are calculated.

At 1320, weights are assigned. As just noted, geometric distance may be determined using Euclidean and semantic distances from a trained word embedding matrix. It is necessary to balance the two distance values using appropriate weights. For example, if the Euclidean distance is larger than the semantic distance, smaller magnitude weights may be used to balance the values. In this regard, in an embodiment the parameters are determined empirically. At 1325, $C_{ij}$ is calculated using the calculated distances, and the weights assigned in the preceding steps. Ordinarily skilled artisans will appreciate that other types of solvers may present different types of equations to calculate the minimum distance, involving the same, similar, or different weights from the ones discussed above, or without such weights at all.

At 1330, the calculated distances and the discerned similarity are used to assign a flag to the text items in question. The flag could signify either "keyword" or "content". At 1340, if the calculation is satisfactory, the process ends. If the calculation is not satisfactory, then at 1345 the weights are adjusted, and the flow returns to 1325.

Figure 14A:
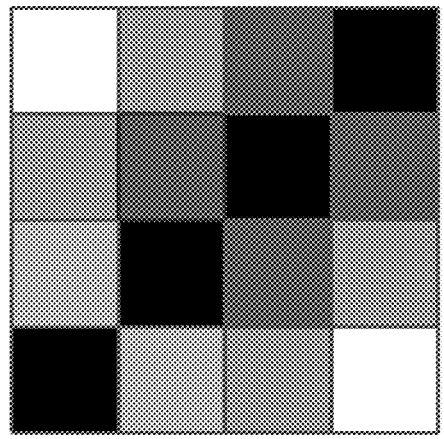
FIGS. 14A and 14B are exemplary illustrations of determinations of keywords and content using the sequences of operation in FIG. 13.
Figure 14A:
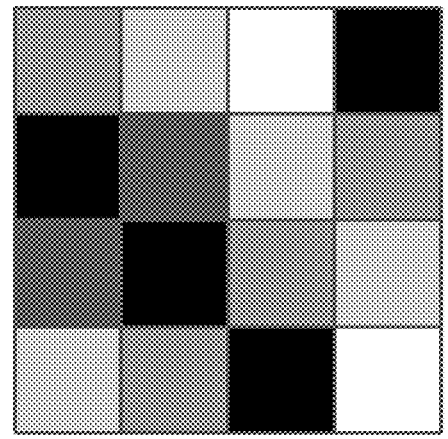
Figure 14A:
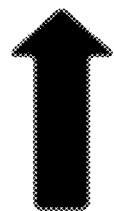
Figure 14A:
Figure 14A:
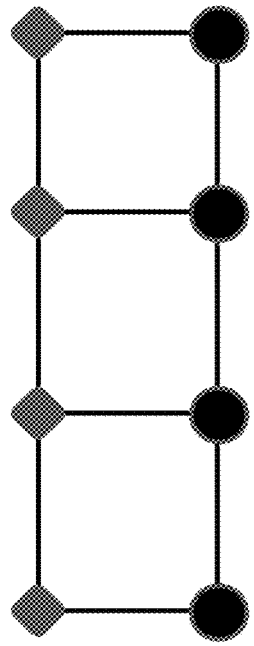
Figure 14B:
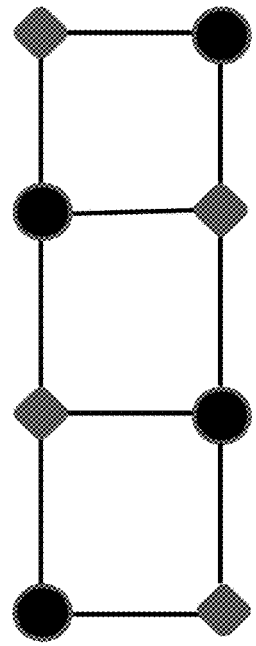

FIGS. 14A and 14B show distance matrices for four pairs of keywords and content. Each row of the matrix corresponds to keywords, and each column of the matrix corresponds to content. In an embodiment, the content may be compressed as discussed above with respect to FIGS. 10A-10D. Alternatively, there may be multiple content entries for a given keyword, as is the case with the figures at the left-hand side of each of FIGS. 10A-10D.

At the right hand side of each of FIG. 14A and 14B, the shading represents the distance value. The darker the shading, the shorter the distance. Black indicates the shortest distance, and white indicates the greatest distance. In a regular pattern such as FIG. 14A, where keywords are in one row and content is in the row immediately beneath, the shortest distances show up on the diagonal elements of the matrix, and show the optimal pairs and associations. Accordingly, it is possible to break ties of neighboring content, and form optimal pairs, using a linear optimization algorithm, as ordinarily skilled artisans will appreciate.

In FIG. 14B, there is a less regular pattern, in that keywords appear in both rows, as do content. Consequently, some of the black squares denoting shortest distances will show up in different locations. In FIGS. 14A and 14B, the positioning of the keywords and content in the second and fourth columns is the same, and so the black squares corresponding to those keyword/content pairs are located in the same position in the matrix. The keywords and content in the first and third columns in FIG. 14B are differently place, however, and so their respective black squares show up in different locations.

In summary and in addition, the inventive approach described herein provides at least the following benefits in aligning form images. First, the technique is robust and accurate for low quality images and scanning artifacts such as smeared characters, strike missed, etc., which known approaches often fail to handle adequately. Second, the approach is highly computationally efficient. Among other things, identification of particular words, characters, or even pixels is not required. Instead, bounding box identification (through, for example, text identification) is sufficient. Such identification can be done using techniques that do not require intricate text recognition. Relatedly, it is possible to employ standard techniques for determining intersection over union. Third, the technique is insensitive to noise and other artifacts such as punch holes, handwritten notes, and the like.

While the foregoing describes embodiments according to aspects of the invention, the invention is not to be considered as limited to those embodiments or aspects. Ordinarily skilled artisans will appreciate variants of the invention within the scope and spirit of the appended claims.

What is claimed is:

1. An auto-registration method comprising:
   responsive to an input of a scanned image, extracting one or more features from the scanned image;
   using a deep learning model,
   distinguishing text from other features in the scanned image, and distinguishing table structures from other features in the scanned image;
   classifying keywords and content from the distinguished text;
   generating a virtual table using the distinguished table structures;
   associating the content with the keywords in the generated virtual table, wherein the associating comprises determining that content is associated with a particular keyword by identifying a lowest cost value $C_{ij}$, wherein $C_{ij}$ is determined as follows:

$C_{ij} = \alpha \cdot G_{ij} + \beta \cdot S_{ij}$ $\alpha, \beta$—weights $G_{ij} = \sqrt{(x_i - x_j)^2 + (y_i - y_j)^2}$ $x_i, y_i$—Position of Keyword i
   $x_j, y_j$—Position of Content j
   $G_{ij}$—Geometric Distance between keyword i and content j
   $S_{ij}$—Semantic Distance between keyword i and content j; and
   outputting the keywords and their associated content as pairs.

2. The auto-registration method of claim 1, wherein a keyword occupies a field in a blank form, and content occupies one or more fields in a filled-in form.

3. The auto-registration method of claim 1, wherein the semantic distance $S_{ij}$ is computed as a distance selected from the group consisting of a geometric distance, a forward rank (FR), a backward rank (BR), an arithmetic average of FR and BR, a geometric average of FR and BR, an harmonic average of FR and BR, a Euclidean distance, a word mover's distance, or a cosine distance.

4. The auto-registration method of claim 1, wherein the semantic distance $S_{ij}$ is computed as follows:

$$S_{ij} = \sqrt{\sum_{i=0}^{n} (m_n^i - n_n^j)^2}$$

$m_n^i$ – Keyword $i$ $n_n^j$ – Content $j$.

5. The auto-registration method of claim 1, further comprising storing the outputted pairs of keywords and their associated content in a database.

6. The auto-registration method of claim 1, further comprising assigning one of a flag "keyword" or a flag "content" to a text item responsive to the classifying.

7. The auto-registration method of claim 1, further comprising adjusting one or both of the weights $\alpha$, $\beta$ in response to a determination that an outcome of the associating is incorrect.

8. The auto-registration method of claim 1, wherein the generating comprises aligning keywords and content in the virtual table by aligning bounding boxes around respective keywords and content.

9. The auto-registration method of claim 1, wherein the deep learning model is selected from the group consisting of convolutional neural networks.

10. An auto-registration system comprising:
    one or more processors;
    one or more non-transitory memory devices; and
    a deep learning system which implements a deep learning model;
    the auto-registration system storing one or more programs in the one or more non-transitory memory devices, the one or more programs containing instructions which, when executed, perform the following:
    responsive to an input of a scanned image, extracting one or more features from the scanned image;
    using the deep learning model, distinguishing text from other features in the scanned image, and distinguishing table structures from other features in the scanned image;
    classifying keywords and content from the distinguished text;
    generating a virtual table using the distinguished table structures;
    associating the content with the keywords in the generated virtual table, wherein the associating comprises determining that content is associated with a particular keyword by identifying a lowest cost value $C_{ij}$, wherein $C_{ij}$ is determined as follows:

$C_{ij} = \alpha \cdot G_{ij} + \beta \cdot S_{ij}$ $\alpha, \beta$—weights $G_{ij} = \sqrt{(x_i - x_j)^2 + (y_i - y_j)^2}$ $x_i, y_i$—Position of Keyword i
    $x_j, y_j$—Position of Content j
    $G_{ij}$—Geometric Distance between keyword i and content j
    $S_{ij}$—Semantic Distance between keyword i and content j; and
    outputting the keywords and their associated content as pairs.

11. The auto-registration system of claim 10, wherein a keyword occupies a field in a blank form, and content occupies one or more fields in a filled-in form.

12. The auto-registration system of claim 10, wherein the one or more programs contain further instructions which, when executed, compute the semantic distance $S_{ij}$ as a distance selected from the group consisting of a geometric distance, a forward rank (FR), a backward rank (BR), an arithmetic average of FR and BR, a geometric average of FR and BR, an harmonic average of FR and BR, a Euclidean distance, a word mover's distance, or a cosine distance.

13. The auto-registration system of claim 10, wherein the one or more programs contain further instructions which, when executed, compute the semantic distance $S_{ij}$ as follows:

$$S_{ij} = \sqrt{\sum_{i=0}^{n} (m_n^i - n_n^j)^2}$$

-continued $m_n^i$ – Keyword $i$ $n_n^j$ – Content $j$.

14. The auto-registration system of claim 10, further comprising storage containing a database to store the outputted pairs of keywords and their associated content.

15. The auto-registration system of claim 14, wherein the deep learning model in the deep learning system comprises a neural network with a plurality of nodes arranged in at least an input layer and an output layer, the output layer providing the outputted pairs of keywords and their associated content for storage in the database.

16. The auto-registration system of claim 15, wherein the deep learning model in the deep learning system is selected from the group consisting of convolutional neural networks.

17. The auto-registration system of claim 10, wherein the one or more programs contain further instructions which, when executed, adjust one or both of the weights $\alpha$, $\beta$ in response to a determination that an outcome of the associating is incorrect.

18. The auto-registration system of claim 10, wherein the one or more programs contain further instructions which, when executed, perform the generating by aligning keywords and content in the virtual table by aligning bounding boxes around respective keywords and content.

* * * * *